(12) United States Patent
Paetow et al.

(10) Patent No.: US 12,253,200 B2
(45) Date of Patent: **\*Mar. 18, 2025**

(54) DEVICE FOR PASSING PIPES OR CABLES THROUGH AN OPENING IN A BUILDING

(71) Applicant: Hilti Aktiengesellschaft, Schaan (LI)

(72) Inventors: Mario Paetow, Igling (DE); Christian Förg, Lamerdingen (DE); Rudolf Semler, Prittriching (DE); Thomas Monden, Stetten (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

This patent is subject to a terminal disclaimer.

(21) Appl. No.: 18/417,836

(22) Filed: Jan. 19, 2024

(65) Prior Publication Data

US 2024/0151329 A1    May 9, 2024

Related U.S. Application Data

(63) Continuation of application No. 18/153,877, filed on Jan. 12, 2023, now Pat. No. 11,913,585, which is a
(Continued)

(30) Foreign Application Priority Data

Dec. 9, 2013   (EP) ..................................... 13196170

(51) Int. Cl.
*F16L 5/04*    (2006.01)
*H02G 3/22*    (2006.01)

(52) U.S. Cl.
CPC . *F16L 5/04* (2013.01); *H02G 3/22* (2013.01)

(58) Field of Classification Search
CPC ..... F16L 5/00; F16L 5/04; H02G 3/22; H02G 3/185; Y10T 16/05
(Continued)

(56) References Cited

U.S. PATENT DOCUMENTS 546,909 A    9/1895  Spencer
563,680 A    7/1896  Nott
(Continued)

FOREIGN PATENT DOCUMENTS

AU    B-30326/95    3/1996
CA    2 787 642     3/2013
(Continued)

OTHER PUBLICATIONS

Document 1, Filed Sep. 22, 2022, "Complaint for Patent Infringement" in Case 1:22-cv-01248-CFC (in the U.S. District Court for the District of Delaware).
(Continued)

*Primary Examiner* — Patrick F Brinson
(74) *Attorney, Agent, or Firm* — Grüneberg and Myers PLLC

(57) ABSTRACT

The invention relates to a device for passing pipes or cables through an opening in a building. Said device comprises a sleeve-like housing that has an axial passage channel that is open at its opposite ends; bristles that are mounted on the walls of the passage channel in such a way that they are opposite each other and that are extended inwards in such a way that they mesh with one another in order to close the passage channel; and flexible strips of material that are mounted in the passage channel and that are coated with an intumescent material.

11 Claims, 2 Drawing Sheets

Related U.S. Application Data continuation of application No. 17/934,345, filed on Sep. 22, 2022, now Pat. No. 11,578,822, which is a continuation of application No. 17/568,082, filed on Jan. 4, 2022, now Pat. No. 11,585,466, which is a continuation of application No. 16/855,049, filed on Apr. 22, 2020, now Pat. No. 11,242,946, which is a continuation of application No. 16/382,475, filed on Apr. 12, 2019, now Pat. No. 10,663,090, which is a continuation of application No. 15/924,160, filed on Mar. 16, 2018, now Pat. No. 10,295,088, which is a continuation of application No. 15/171,593, filed on Jun. 2, 2016, now Pat. No. 9,982,805, which is a continuation of application No. PCT/EP2014/076168, filed on Dec. 2, 2014.

(58) Field of Classification Search
USPC .... 138/106, 103, 109; 174/659, 660, 153 G, 174/152 G; 15/DIG. 6, DIG. 5
See application file for complete search history.

(56) References Cited

U.S. PATENT DOCUMENTS

| | | |
|---|---|---|
| 694,670 A | 3/1902 | Schiek |
| 1,192,989 A | 8/1916 | Clifford |
| 3,143,208 A | 8/1964 | Sizemore, Jr. |
| 3,188,686 A | 6/1965 | Orcutt |
| 3,232,786 A | 2/1966 | Kellman |
| 4,303,158 A | 12/1981 | Perkins |
| 4,361,922 A | 12/1982 | Karal |
| 4,401,716 A | 8/1983 | Tschudin-Mahrer |
| 4,460,804 A | 7/1984 | Svejkovsky |
| 4,538,389 A | 9/1985 | Heinen |
| 4,649,089 A | 3/1987 | Thwaites |
| 4,807,805 A | 2/1989 | Rutkowski |
| 4,854,009 A | 8/1989 | Brockhaus |
| 4,901,488 A | 2/1990 | Murota et al. |
| 5,058,341 A | 10/1991 | Harbeke, Jr. |
| 5,090,710 A | 2/1992 | Flower |
| 5,331,946 A | 7/1994 | Yamini et al. |
| 5,347,767 A | 9/1994 | Roth |
| 5,351,448 A | 10/1994 | Gohlke et al. |
| 5,390,458 A | 2/1995 | Menchetti |
| 5,421,127 A | 6/1995 | Stefely |
| 5,452,551 A | 9/1995 | Charland et al. |
| 5,456,050 A | 10/1995 | Ward |
| 5,475,948 A | 12/1995 | Parke |
| 5,548,934 A | 8/1996 | Israelson |
| 5,765,318 A | 6/1998 | Michelsen |
| 5,836,424 A | 11/1998 | Allen |
| 6,018,126 A | 1/2000 | Castellani et al. |
| 6,114,623 A | 9/2000 | Bonilla et al. |
| 6,125,608 A | 10/2000 | Charlson |
| 6,167,915 B1 | 1/2001 | Collie et al. |
| 6,172,052 B1 | 1/2001 | Cook et al. |
| 6,176,052 B1 | 1/2001 | Takahashi |
| 6,336,297 B1 | 1/2002 | Cornwall |
| 6,360,502 B1 | 3/2002 | Stahl, Jr. |
| 6,426,463 B2 | 7/2002 | Münzenberger et al. |
| 6,479,119 B1 | 11/2002 | Simpson |
| 6,572,948 B1 | 6/2003 | Dykhoff |
| 6,632,999 B2 | 10/2003 | Sempliner et al. |
| 6,718,100 B2 | 4/2004 | Morris |
| 6,725,615 B1 | 4/2004 | Porter |
| 6,732,481 B2 | 5/2004 | Stahl, Sr. |
| 6,783,345 B2 | 8/2004 | Morgan et al. |
| D502,147 S | 2/2005 | Stahl, Sr. |
| 6,848,227 B2 | 2/2005 | Whitty |
| 6,928,777 B2 | 8/2005 | Cordts |
| 6,935,080 B2 | 8/2005 | Allwein et al. |
| 7,240,905 B1 | 7/2007 | Stahl, Sr. |
| 7,373,761 B2 | 5/2008 | Stahl, Sr. |
| 7,375,277 B1 | 5/2008 | Skinner et al. |
| 7,427,050 B2 | 9/2008 | Stahl, Sr. et al. |
| 7,465,888 B2 | 12/2008 | Fischer et al. |
| 7,478,503 B2 | 1/2009 | Milani et al. |
| 7,523,590 B2 | 4/2009 | Stahl, Sr. |
| 7,560,644 B2 | 7/2009 | Ford et al. |
| 7,596,914 B2 | 10/2009 | Stahl, Sr. et al. |
| 7,681,365 B2 | 3/2010 | Klein |
| 7,685,792 B2 | 3/2010 | Stahl, Sr. et al. |
| 7,694,474 B1 | 4/2010 | Stahl, Sr. et al. |
| 7,797,893 B2 | 9/2010 | Stahl, Sr. et al. |
| 7,856,775 B2 | 12/2010 | Stahl, Jr. |
| 7,866,108 B2 | 1/2011 | Klein |
| 7,867,591 B2 | 1/2011 | Sieber et al. |
| 7,950,198 B2 | 5/2011 | Pilz et al. |
| 7,987,872 B2 | 8/2011 | Bouhaj |
| 8,051,614 B1 | 11/2011 | Peck et al. |
| D657,232 S | 4/2012 | Stahl, Sr. et al. |
| 8,188,382 B2 | 5/2012 | Monden et al. |
| 8,266,854 B2 | 9/2012 | Reddicliffe |
| 8,349,426 B2 | 1/2013 | Deiss |
| 8,375,666 B2 | 2/2013 | Stahl, Jr. et al. |
| 8,397,451 B2 | 3/2013 | Pirner |
| 8,397,452 B2 | 3/2013 | Stahl, Sr. et al. |
| 8,419,876 B1 | 4/2013 | Harris |
| 8,584,415 B2 | 11/2013 | Stahl, Jr. et al. |
| 8,590,231 B2 | 11/2013 | Pilz |
| 8,595,999 B1 | 12/2013 | Pilz et al. |
| 8,671,632 B2 | 3/2014 | Pilz et al. |
| 8,672,275 B2 | 3/2014 | Van Walraven et al. |
| 8,683,762 B2 | 4/2014 | Rodriquez et al. |
| 8,739,482 B1 | 6/2014 | Feil, III et al. |
| 8,793,946 B2 | 8/2014 | Stahl, Jr. et al. |
| 8,826,599 B2 | 9/2014 | Stahl, Jr. |
| 8,833,478 B2 | 9/2014 | Zernach et al. |
| 8,869,475 B2 | 10/2014 | Lopes |
| 8,887,458 B2 | 11/2014 | Lopes |
| 8,910,949 B2 | 12/2014 | Åkesson |
| 8,911,206 B2 | 12/2014 | Campbell et al. |
| 8,955,275 B2 | 2/2015 | Stahl, Jr. |
| 8,967,438 B2 | 3/2015 | Russell et al. |
| 9,046,194 B2 | 6/2015 | Gandolfo et al. |
| 9,157,232 B2 | 10/2015 | Stahl, Jr. |
| 9,162,093 B2 | 10/2015 | Foerg et al. |
| 9,246,315 B2 | 1/2016 | Boyd |
| 10,143,868 B2 | 12/2018 | Lopes et al. |
| 10,295,088 B2 | 5/2019 | Paetow et al. |
| 10,641,417 B2 | 5/2020 | Muenzenberger |
| 11,591,790 B2 | 2/2023 | Deiss |
| 2005/0133242 A1 | 6/2005 | Kreutz |
| 2005/0139126 A1 | 6/2005 | Khan et al. |
| 2006/0037264 A1 | 2/2006 | Paetow et al. |
| 2006/0138251 A1 | 6/2006 | Stahl, Sr. |
| 2007/0125018 A1 | 6/2007 | Stahl, Sr. |
| 2007/0151183 A1 | 7/2007 | Stahl, Sr. et al. |
| 2007/0175125 A1 | 8/2007 | Stahl, Sr. et al. |
| 2007/0204540 A1 | 9/2007 | Stahl, Sr. et al. |
| 2007/0212495 A1 | 9/2007 | Nuzzo |
| 2007/0261339 A1 | 11/2007 | Stahl, Sr. et al. |
| 2007/0261343 A1 | 11/2007 | Stahl, Sr. et al. |
| 2008/0134584 A1 | 6/2008 | McGhee |
| 2008/0309017 A1 | 12/2008 | Mattice |
| 2009/0049781 A1 | 2/2009 | Pilz et al. |
| 2009/0075539 A1 | 3/2009 | Dimanshteyn et al. |
| 2009/0126297 A1 | 5/2009 | Stahl, Jr. |
| 2009/0151983 A1 | 6/2009 | Sempliner et al. |
| 2009/0218130 A1 | 9/2009 | Monden et al. |
| 2010/0223878 A1 | 9/2010 | Lipka et al. |
| 2011/0011019 A1 | 1/2011 | Stahl, Jr. et al. |
| 2011/0030281 A1 | 2/2011 | Vulpitta |
| 2011/0088342 A1 | 4/2011 | Stahl, Sr. et al. |
| 2011/0094759 A1 | 4/2011 | Lopes |
| 2011/0143121 A1 | 6/2011 | Deiss |
| 2012/0304979 A1 | 12/2012 | Munzenberger et al. |
| 2013/0061544 A1 | 3/2013 | Stahl, Jr. et al. |
| 2013/0091790 A1 | 4/2013 | Stahl, Jr. et al. |
| 2013/0097948 A1 | 4/2013 | Burgess |
| 2013/0205694 A1 | 8/2013 | Stahl, Jr. |
| 2013/0277918 A1 | 10/2013 | Fitzgerald et al. |
| 2013/0307225 A1 | 11/2013 | Boyd |

(56) References Cited

U.S. PATENT DOCUMENTS

| | | |
|---|---|---|
| 2014/0020915 A1 | 1/2014 | Lopes |
| 2014/0077043 A1 | 3/2014 | Foerg |
| 2014/0137494 A1 | 5/2014 | Stahl, Jr. et al. |
| 2014/0360115 A1 | 12/2014 | Stahl, Jr. |
| 2015/0007515 A1 | 1/2015 | Stahl, Jr. |
| 2015/0047276 A1 | 2/2015 | Gandolfo et al. |
| 2015/0135622 A1 | 5/2015 | Muenzenberger et al. |
| 2015/0251028 A1 | 9/2015 | Klein et al. |
| 2015/0298155 A1 | 10/2015 | Sackler |
| 2016/0244612 A1 | 8/2016 | Unohara et al. |
| 2018/0259095 A1 | 9/2018 | Schulz-Hanke |
| 2019/0305539 A1 | 10/2019 | Schulz-Hanke, Sr. et al. |

FOREIGN PATENT DOCUMENTS

| | | |
|---|---|---|
| CA | 2 841 523 | 9/2014 |
| CA | 2 849 597 | 12/2014 |
| DE | 216225 | 11/1909 |
| DE | 2 043 784 | 4/1971 |
| DE | 94 11 293 U1 | 9/1994 |
| DE | 198 18 769 | 11/1999 |
| DE | 100 43 430 | 3/2002 |
| DE | 20 2006 019 593 U1 | 4/2007 |
| DE | 20 2009 005 996 | 8/2009 |
| DE | 20 2011 100 855 | 7/2011 |
| DE | 10 2011 105 575 | 9/2012 |
| DE | 20 2013 004 376 | 6/2013 |
| DE | 20 2013 103 170 U1 | 9/2013 |
| EP | 0 869 303 | 10/1998 |
| EP | 0 988 873 | 3/2000 |
| EP | 1 313 192 | 5/2003 |
| ES | 2 312 276 | 2/2009 |
| FR | 2 675 532 | 10/1992 |
| FR | 2 787 825 | 6/2000 |
| GB | 2 111 624 | 7/1983 |
| GB | 2 216 220 | 10/1989 |
| GB | 2 233 725 | 1/1991 |
| GB | 2 255 121 | 10/1992 |
| GB | 2 318 975 | 5/1998 |
| GB | 2 457 152 | 8/2009 |
| JP | 2000-240854 | 9/2000 |
| JP | 2003-056098 | 2/2003 |
| JP | 2007-032631 | 2/2007 |
| JP | 2010-57757 | 3/2010 |
| JP | 2011-074969 | 4/2011 |
| JP | 4753850 | 8/2011 |
| JP | 2011-190614 | 9/2011 |
| JP | 2014-148998 | 8/2014 |
| JP | 2015-057560 | 3/2015 |
| KR | 2002-0083301 | 11/2002 |
| KR | 10-2012-0139936 | 12/2012 |
| WO | 96/24549 | 8/1996 |
| WO | 2002/037011 | 5/2002 |
| WO | 2004/015319 | 2/2004 |
| WO | 2007/061572 | 5/2007 |
| WO | 2013/160776 | 10/2013 |
| WO | 2014/071362 | 5/2014 |
| WO | 2014/081446 | 5/2014 |
| WO | 2015/023313 | 2/2015 |
| WO | 2015/155492 | 10/2015 |

OTHER PUBLICATIONS

Exhibit 1 to Document 1, Filed Sep. 22, 2022, "Complaint for Patent Infringement" in Case 1:22-cv-01248-CFC (in the U.S. District Court for the District of Delaware).
Exhibit 2 to Document 1, Filed Sep. 22, 2022, "Complaint for Patent Infringement" in Case 1:22-cv-01248-CFC (in the U.S. District Court for the District of Delaware).
Exhibit 3 to Document 1, Filed Sep. 22, 2022, "Complaint for Patent Infringement" in Case 1:22-cv-01248-CFC (in the U.S. District Court for the District of Delaware).
Exhibit 4 to Document 1, Filed Sep. 22, 2022, "Complaint for Patent Infringement" in Case 1:22-cv-01248-CFC (in the U.S. District Court for the District of Delaware).
Exhibit 5 to Document 1, Filed Sep. 22, 2022, "Complaint for Patent Infringement" in Case 1:22-cv-01248-CFC (in the U.S. District Court for the District of Delaware).
Exhibit 6 to Document 1, Filed Sep. 22, 2022, "Complaint for Patent Infringement" in Case 1:22-cv-01248-CFC (in the U.S. District Court for the District of Delaware).
Exhibit 7 to Document 1, Filed Sep. 22, 2022, "Complaint for Patent Infringement" in Case 1:22-cv-01248-CFC (in the U.S. District Court for the District of Delaware).
Exhibit 8 to Document 1, Filed Sep. 22, 2022, "Complaint for Patent Infringement" in Case 1:22-cv-01248-CFC (in the U.S. District Court for the District of Delaware).
Exhibit 9 to Document 1, Filed Sep. 22, 2022, "Complaint for Patent Infringement" in Case 1:22-cv-01248-CFC (in the U.S. District Court for the District of Delaware).
Exhibit 10 to Document 1, Filed Sep. 22, 2022, "Complaint for Patent Infringement" in Case 1:22-cv-01248-CFC (in the U.S. District Court for the District of Delaware).
Exhibit 11 to Document 1, Filed Sep. 22, 2022, "Complaint for Patent Infringement" in Case 1:22-cv-01248-CFC (in the U.S. District Court for the District of Delaware).
Exhibit 12 to Document 1, Filed Sep. 22, 2022, "Complaint for Patent Infringement" in Case 1:22-cv-01248-CFC (in the U.S. District Court for the District of Delaware).
Exhibit 13 to Document 1, Filed Sep. 22, 2022, "Complaint for Patent Infringement" in Case 1:22-cv-01248-CFC (in the U.S. District Court for the District of Delaware).
Exhibit 14 to Document 1, Filed Sep. 22, 2022, "Complaint for Patent Infringement" in Case 1:22-cv-01248-CFC (in the U.S. District Court for the District of Delaware).
Exhibit 15 to Document 1, Filed Sep. 22, 2022, "Complaint for Patent Infringement" in Case 1:22-cv-01248-CFC (in the U.S. District Court for the District of Delaware).
Exhibit 16 to Document 1, Filed Sep. 22, 2022, "Complaint for Patent Infringement" in Case 1:22-cv-01248-CFC (in the U.S. District Court for the District of Delaware).
Exhibit 17 to Document 1, Filed Sep. 22, 2022, "Complaint for Patent Infringement" in Case 1:22-cv-01248-CFC (in the U.S. District Court for the District of Delaware).
Exhibit 18 to Document 1, Filed Sep. 22, 2022, "Complaint for Patent Infringement" in Case 1:22-cv-01248-CFC (in the U.S. District Court for the District of Delaware).
Exhibit 19 to Document 1, Filed Sep. 22, 2022, "Complaint for Patent Infringement" in Case 1:22-cv-01248-CFC (in the U.S. District Court for the District of Delaware).
Exhibit 20 to Document 1, Filed Sep. 22, 2022, "Complaint for Patent Infringement" in Case 1:22-cv-01248-CFC (in the U.S. District Court for the District of Delaware).
Exhibit 21 to Document 1, Filed Sep. 22, 2022, "Complaint for Patent Infringement" in Case 1:22-cv-01248-CFC (in the U.S. District Court for the District of Delaware).
Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 1 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 2 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 3 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 4 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).

(56) References Cited

OTHER PUBLICATIONS

Exhibit 5 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 6 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 7 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 8 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 9 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 10 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 11 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 12 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 13 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 14 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 15 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 16 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 17 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 18 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 19 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 20 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 21 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 22 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 23 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 24 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 25 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 26 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 27 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 28 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 29 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 30 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 31 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 32 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 33 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 34 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 35 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 36 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 37 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 38 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 39 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).

(56) References Cited

OTHER PUBLICATIONS

Exhibit 40 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 41 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 42 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 43 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 44 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Exhibit 45 to Document 13, Filed Nov. 21, 2022, "Specified Technologies, Inc.'s Answer to Complaint for Patent Infringement, Defenses, and Counterclaims" in Case 1:22-cv-01248-CFC (in the U.S. District Court for the District of Delaware).
Document filed Jun. 30, 2023, "Plaintiff Hilti Aktiengesellsschaft's Invalidity Contentions" in Case 1:22-cv-01248-CJB (in the U.S. District Court for the District of Delaware).
Exhibit 1 to Document filed Jun. 30, 2023, "Plaintiff Hilti Aktiengesellsschaft's Invalidity Contentions" in Case 1:22-cv-01248-CJB (in the U.S. District Court for the District of Delaware).
Exhibit 2 to Document filed Jun. 30, 2023, "Plaintiff Hilti Aktiengesellsschaft's Invalidity Contentions" in Case 1:22-cv-01248-CJB (in the U.S. District Court for the District of Delaware).
Exhibit 3 to Document filed Jun. 30, 2023, "Plaintiff Hilti Aktiengesellsschaft's Invalidity Contentions" in Case 1:22-cv-01248-CJB (in the U.S. District Court for the District of Delaware).
Exhibit 4 to Document filed Jun. 30, 2023, "Plaintiff Hilti Aktiengesellsschaft's Invalidity Contentions" in Case 1:22-cv-01248-CJB (in the U.S. District Court for the District of Delaware).
Exhibit 5 to Document filed Jun. 30, 2023, "Plaintiff Hilti Aktiengesellsschaft's Invalidity Contentions" in Case 1:22-cv-01248-CJB (in the U.S. District Court for the District of Delaware).
Exhibit 6 to Document filed Jun. 30, 2023, "Plaintiff Hilti Aktiengesellsschaft's Invalidity Contentions" in Case 1:22-cv-01248-CJB (in the U.S. District Court for the District of Delaware).
Exhibit 7 to Document filed Jun. 30, 2023, "Plaintiff Hilti Aktiengesellsschaft's Invalidity Contentions" in Case 1:22-cv-01248-CJB (in the U.S. District Court for the District of Delaware).
Exhibit 8 to Document filed Jun. 30, 2023, "Plaintiff Hilti Aktiengesellsschaft's Invalidity Contentions" in Case 1:22-cv-01248-CJB (in the U.S. District Court for the District of Delaware).
Exhibit 9 to Document filed Jun. 30, 2023, "Plaintiff Hilti Aktiengesellsschaft's Invalidity Contentions" in Case 1:22-cv-01248-CJB (in the U.S. District Court for the District of Delaware).
Exhibit 10 to Document filed Jun. 30, 2023, "Plaintiff Hilti Aktiengesellsschaft's Invalidity Contentions" in Case 1:22-cv-01248-CJB (in the U.S. District Court for the District of Delaware).
Exhibit 11 to Document filed Jun. 30, 2023, "Plaintiff Hilti Aktiengesellsschaft's Invalidity Contentions" in Case 1:22-cv-01248-CJB (in the U.S. District Court for the District of Delaware).
Exhibit 12 to Document filed Jun. 30, 2023, "Plaintiff Hilti Aktiengesellsschaft's Invalidity Contentions" in Case 1:22-cv-01248-CJB (in the U.S. District Court for the District of Delaware).
Exhibit 13 to Document filed Jun. 30, 2023, "Plaintiff Hilti Aktiengesellsschaft's Invalidity Contentions" in Case 1:22-cv-01248-CJB (in the U.S. District Court for the District of Delaware).
Exhibit 14 to Document filed Jun. 30, 2023, "Plaintiff Hilti Aktiengesellsschaft's Invalidity Contentions" in Case 1:22-cv-01248-CJB (in the U.S. District Court for the District of Delaware).
Exhibit 15 to Document filed Jun. 30, 2023, "Plaintiff Hilti Aktiengesellschaft's Invalidity Contentions" in Case 1:22-cv-01248-CJB (in the U.S. District Court for the District of Delaware).
Exhibit 16 to Document filed Jun. 30, 2023, "Plaintiff Hilti Aktiengesellschaft's Invalidity Contentions" in Case 1:22-cv-01248-CJB (in the U.S. District Court for the District of Delaware).
Exhibit 17 to Document filed Jun. 30, 2023, "Plaintiff Hilti Aktiengesellschaft's Invalidity Contentions" in Case 1:22-cv-01248-CJB (in the U.S. District Court for the District of Delaware).
Exhibit 18 to Document filed Jun. 30, 2023, "Plaintiff Hilti Aktiengesellschaft's Invalidity Contentions" in Case 1:22-cv-01248-CJB (in the U.S. District Court for the District of Delaware).
Exhibit 19 to Document filed Jun. 30, 2023, "Plaintiff Hilti Aktiengesellschaft's Invalidity Contentions" in Case 1:22-cv-01248-CJB (in the U.S. District Court for the District of Delaware).
Exhibit 20 to Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003902-0003907 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003908-0003915 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003916-0003920 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003921-0003930 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003931-0003934 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003935-0003940 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003941-0003946 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003947-0003957 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003958-0003962 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003963-0003978 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003983-0003986 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003987-0003993 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003994-0003997 filed with Document filed Jun. 30, 2023, "Plaintiff Hilti Aktiengesellschaft's Invalidity Contentions" in Case 1:22-cv-01248-CJB (in the U.S. District Court for the District of Delaware).

(56) References Cited

OTHER PUBLICATIONS

Document 1248HILTI0003998-0004009 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004009-0004014 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004015-0004021 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004022-0004042 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004043-0004067 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004094-0004115 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004116-0004128 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004129-0004143 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004144-0004155 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004156-0004165 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004166-0004172 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004173-0004197 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004217-0004232 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004233-0004242 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004243-0004265 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004266-0004297 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004298-0004318 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004340-0004376 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003900-0003901 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0003979-0003982 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004068-0004069 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004070-0004081 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004082-0004093 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004377-0004378 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004379 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004380-0004383 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004384 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004385 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004386 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004387 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004388 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004389 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004390 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004393 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004394 filed with Document filed Jun. 30, 2023, "Plaintiff Hilti Aktiengesellschaft's Invalidity Contentions" in Case 1:22-cv-01248-CJB (in the U.S. District Court for the District of Delaware).

(56) References Cited

OTHER PUBLICATIONS

Document 1248HILTI0004395 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004396 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004397 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004398 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004399 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004400 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004401 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004402 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004403 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004404 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004405-0004406 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004407-0004433 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004459-0004460 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004461-0004465 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004466-0004469 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004470-0004471 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004472 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004473 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004474-0004485 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004486-0004487 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004491-0004493 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004494-0004534 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004391 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document 1248HILTI0004392 filed with Document filed Jun. 30, 2023, "Plaintiff Hilti Aktiengesellschaft's Invalidity Contentions" in Case 1:22-cv-01248-CJB (in the U.S. District Court for the District of Delaware).
Document filed Jun. 30, 2023, "Specified Technologies Inc.'s Invalidity Contentions" in Case 1:22-cv-01248-CJB (in the U.S. District Court for the District of Delaware).
Exhibit D-1 to Document filed Jun. 30, 2023, "Specified Technologies Inc.'s Invalidity Contentions" in Case 1:22-cv-01248-CJB (in the U.S. District Court for the District of Delaware).
Exhibit D-2 to Document filed Jun. 30, 2023, "Specified Technologies Inc.'s Invalidity Contentions" in Case 1:22-cv-01248-CJB (in the U.S. District Court for the District of Delaware).
Exhibit D-3 to Document filed Jun. 30, 2023, "Specified Technologies Inc.'s Invalidity Contentions" in Case 1:22-cv-01248-CJB (in the U.S. District Court for the District of Delaware).
Exhibit D-4 to Document filed Jun. 30, 2023, "Specified Technologies Inc.'s Invalidity Contentions" in Case 1:22-cv-01248-CJB (in the U.S. District Court for the District of Delaware).
Exhibit D-5 to Document filed Jun. 30, 2023, "Specified Technologies Inc.'s Invalidity Contentions" in Case 1:22-cv-01248-CJB (in the U.S. District Court for the District of Delaware).
Exhibit D-6 to Document filed Jun. 30, 2023, "Specified Technologies Inc.'s Invalidity Contentions" in Case 1:22-cv-01248-CJB (in the U.S. District Court for the District of Delaware).
Exhibit D-7 to Document filed Jun. 30, 2023, "Specified Technologies Inc.'s Invalidity Contentions" in Case 1:22-cv-01248-CJB (in the U.S. District Court for the District of Delaware).
Exhibit D-8 to Document filed Jun. 30, 2023, "Specified Technologies Inc.'s Invalidity Contentions" in Case 1:22-cv-01248-CJB (in the U.S. District Court for the District of Delaware).
Exhibit D-9 to Document filed Jun. 30, 2023, "Specified Technologies Inc.'s Invalidity Contentions" in Case 1:22-cv-01248-CJB (in the U.S. District Court for the District of Delaware).
Exhibit D-10 to Document filed Jun. 30, 2023, "Specified Technologies Inc.'s Invalidity Contentions" in Case 1:22-cv-01248-CJB (in the U.S. District Court for the District of Delaware).
Exhibit D-11 to Document filed Jun. 30, 2023, "Specified Technologies Inc.'s Invalidity Contentions" in Case 1:22-cv-01248-CJB (in the U.S. District Court for the District of Delaware).
Exhibit D-12 to Document filed Jun. 30, 2023, "Specified Technologies Inc.'s Invalidity Contentions" in Case 1:22-cv-01248-CJB (in the U.S. District Court for the District of Delaware).
Exhibit D-13 to Document filed Jun. 30, 2023, "Specified Technologies Inc.'s Invalidity Contentions" in Case 1:22-cv-01248-CJB (in the U.S. District Court for the District of Delaware).
Exhibit D-14 to Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Exhibit D-15 to Document filed Jun. 30, 2023, "Specified Technologies Inc.'s Invalidity Contentions" in Case 1:22-cv-01248-CJB (in the U.S. District Court for the District of Delaware).
Exhibit D-16 to Document filed Jun. 30, 2023, "Specified Technologies Inc.'s Invalidity Contentions" in Case 1:22-cv-01248-CJB (in the U.S. District Court for the District of Delaware).
Exhibit A-1 to Document filed Jun. 30, 2023, "Specified Technologies Inc.'s Invalidity Contentions" in Case 1:22-cv-01248-CJB (in the U.S. District Court for the District of Delaware).
Exhibit A-2 to Document filed Jun. 30, 2023, "Specified Technologies Inc.'s Invalidity Contentions" in Case 1:22-cv-01248-CJB (in the U.S. District Court for the District of Delaware).
Exhibit A-3 to Document filed Jun. 30, 2023, "Specified Technologies Inc.'s Invalidity Contentions" in Case 1:22-cv-01248-CJB (in the U.S. District Court for the District of Delaware).
Exhibit A-4 to Document filed Jun. 30, 2023, "Specified Technologies Inc.'s Invalidity Contentions" in Case 1:22-cv-01248-CJB (in the U.S. District Court for the District of Delaware).
Exhibit A-5 to Document filed Jun. 30, 2023, "Specified Technologies Inc.'s Invalidity Contentions" in Case 1:22-cv-01248-CJB (in the U.S. District Court for the District of Delaware).
Exhibit A-6 to Document filed Jun. 30, 2023, "Specified Technologies Inc.'s Invalidity Contentions" in Case 1:22-cv-01248-CJB (in the U.S. District Court for the District of Delaware).
Exhibit A-7 to Document filed Jun. 30, 2023, "Specified Technologies Inc.'s Invalidity Contentions" in Case 1:22-cv-01248-CJB (in the U.S. District Court for the District of Delaware).
Exhibit A-8 to Document filed Jun. 30, 2023, "Specified Technologies Inc.'s Invalidity Contentions" in Case 1:22-cv-01248-CJB (in the U.S. District Court for the District of Delaware).
Exhibit A-9 to Document filed Jun. 30, 2023, "Specified Technologies Inc.'s Invalidity Contentions" in Case 1:22-cv-01248-CJB (in the U.S. District Court for the District of Delaware).
Exhibit A-10 to Document filed Jun. 30, 2023, "Specified Technologies Inc.'s Invalidity Contentions" in Case 1:22-cv-01248-CJB (in the U.S. District Court for the District of Delaware).
Exhibit A-11 to Document filed Jun. 30, 2023, "Specified Technologies Inc.'s Invalidity Contentions" in Case 1:22-cv-01248-CJB (in the U.S. District Court for the District of Delaware).
Exhibit A-12 to Document filed Jun. 30, 2023, "Specified Technologies Inc.'s Invalidity Contentions" in Case 1:22-cv-01248-CJB (in the U.S. District Court for the District of Delaware).
Exhibit A-13 to Document filed Jun. 30, 2023, "Specified Technologies Inc.'s Invalidity Contentions" in Case 1:22-cv-01248-CJB (in the U.S. District Court for the District of Delaware).
Exhibit A-14 to Document filed Jun. 30, 2023, "Specified Technologies Inc.'s Invalidity Contentions" in Case 1:22-cv-01248-CJB (in the U.S. District Court for the District of Delaware).
Exhibit A-15 to Document filed Jun. 30, 2023, "Specified Technologies Inc.'s Invalidity Contentions" in Case 1:22-cv-01248-CJB (in the U.S. District Court for the District of Delaware).
Exhibit A-16 to Document filed Jun. 30, 2023, "Specified Technologies Inc.'s Invalidity Contentions" in Case 1:22-cv-01248-CJB (in the U.S. District Court for the District of Delaware).
Exhibit A-17 to Document filed Jun. 30, 2023, "Specified Technologies Inc.'s Invalidity Contentions" in Case 1:22-cv-01248-CJB (in the U.S. District Court for the District of Delaware).
Exhibit A-18 to Document filed Jun. 30, 2023, "Specified Technologies Inc.'s Invalidity Contentions" in Case 1:22-cv-01248-CJB (in the U.S. District Court for the District of Delaware).
Exhibit B-1 to Document filed Jun. 30, 2023, "Specified Technologies Inc.'s Invalidity Contentions" in Case 1:22-cv-01248-CJB (in the U.S. District Court for the District of Delaware).
Exhibit B-2 to Document filed Jun. 30, 2023, "Specified Technologies Inc.'s Invalidity Contentions" in Case 1:22-cv-01248-CJB (in the U.S. District Court for the District of Delaware).
Exhibit B-3 to Document filed Jun. 30, 2023, "Specified Technologies Inc.'s Invalidity Contentions" in Case 1:22-cv-01248-CJB (in the U.S. District Court for the District of Delaware).
Exhibit B-4 to Document filed Jun. 30, 2023, "Specified Technologies Inc.'s Invalidity Contentions" in Case 1:22-cv-01248-CJB (in the U.S. District Court for the District of Delaware).
Exhibit B-5 to Document filed Jun. 30, 2023, "Specified Technologies Inc.'s Invalidity Contentions" in Case 1:22-cv-01248-CJB (in the U.S. District Court for the District of Delaware).
Exhibit B-6 to Document filed Jun. 30, 2023, "Specified Technologies Inc.'s Invalidity Contentions" in Case 1:22-cv-01248-CJB (in the U.S. District Court for the District of Delaware).
Exhibit B-7 to Document filed Jun. 30, 2023, "Specified Technologies Inc.'s Invalidity Contentions" in Case 1:22-cv-01248-CJB (in the U.S. District Court for the District of Delaware).
Exhibit B-8 to Document filed Jun. 30, 2023, "Specified Technologies Inc.'s Invalidity Contentions" in Case 1:22-cv-01248-CJB (in the U.S. District Court for the District of Delaware).
Exhibit B-9 to Document filed Jun. 30, 2023, "Specified Technologies Inc.'s Invalidity Contentions" in Case 1:22-cv-01248-CJB (in the U.S. District Court for the District of Delaware).
Exhibit B-10 to Document filed Jun. 30, 2023, "Specified Technologies Inc.'s Invalidity Contentions" in Case 1:22-cv-01248-CJB (in the U.S. District Court for the District of Delaware).
Exhibit B-11 to Document filed Jun. 30, 2023, "Specified Technologies Inc.'s Invalidity Contentions" in Case 1:22-cv-01248-CJB (in the U.S. District Court for the District of Delaware).
Exhibit B-12 to Document filed Jun. 30, 2023, "Specified Technologies Inc.'s Invalidity Contentions" in Case 1:22-cv-01248-CJB (in the U.S. District Court for the District of Delaware).
Exhibit B-13 to Document filed Jun. 30, 2023, "Specified Technologies Inc.'s Invalidity Contentions" in Case 1:22-cv-01248-CJB (in the U.S. District Court for the District of Delaware).
Exhibit B-14 to Document filed Jun. 30, 2023, "Specified Technologies Inc.'s Invalidity Contentions" in Case 1:22-cv-01248-CJB (in the U.S. District Court for the District of Delaware).
Exhibit B-15 to Document filed Jun. 30, 2023, "Specified Technologies Inc.'s Invalidity Contentions" in Case 1:22-cv-01248-CJB (in the U.S. District Court for the District of Delaware).
Exhibit B-16 to Document filed Jun. 30, 2023, "Specified Technologies Inc.'s Invalidity Contentions" in Case 1:22-cv-01248-CJB (in the U.S. District Court for the District of Delaware).
Exhibit B-17 to Document filed Jun. 30, 2023, "Specified Technologies Inc.'s Invalidity Contentions" in Case 1:22-cv-01248-CJB (in the U.S. District Court for the District of Delaware).
Exhibit B-18 to Document filed Jun. 30, 2023, "Specified Technologies Inc.'s Invalidity Contentions" in Case 1:22-cv-01248-CJB (in the U.S. District Court for the District of Delaware).
Exhibit I to Document filed Jun. 30, 2023, "Specified Technologies Inc.'s Invalidity Contentions" in Case 1:22-cv-01248-CJB (in the U.S. District Court for the District of Delaware).
Exhibit F to Document filed Jun. 30, 2023, "Specified Technologies Inc.'s Invalidity Contentions" in Case 1:22-cv-01248-CJB (in the U.S. District Court for the District of Delaware).
Exhibit H to Document filed Jun. 30, 2023, "Specified Technologies Inc.'s Invalidity Contentions" in Case 1:22-cv-01248-CJB (in the U.S. District Court for the District of Delaware).
Exhibit G to Document filed Jun. 30, 2023, "Specified Technologies Inc.'s Invalidity Contentions" in Case 1:22-cv-01248-CJB (in the U.S. District Court for the District of Delaware).
Exhibit E-1 to Document filed Jun. 30, 2023, "Specified Technologies Inc.'s Invalidity Contentions" in Case 1:22-cv-01248-CJB (in the U.S. District Court for the District of Delaware).
Exhibit E-2 to Document filed Jun. 30, 2023, "Specified Technologies Inc.'s Invalidity Contentions" in Case 1:22-cv-01248-CJB (in the U.S. District Court for the District of Delaware).
Exhibit E-3 to Document filed Jun. 30, 2023, "Specified Technologies Inc.'s Invalidity Contentions" in Case 1:22-cv-01248-CJB (in the U.S. District Court for the District of Delaware).
Exhibit E-4 to Document filed Jun. 30, 2023, "Specified Technologies Inc.'s Invalidity Contentions" in Case 1:22-cv-01248-CJB (in the U.S. District Court for the District of Delaware).
Exhibit E-5 to Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Exhibit E-6 to Document filed Jun. 30, 2023, "Specified Technologies Inc.'s Invalidity Contentions" in Case 1:22-cv-01248-CJB (in the U.S. District Court for the District of Delaware).
Exhibit E-7 to Document filed Jun. 30, 2023, "Specified Technologies Inc.'s Invalidity Contentions" in Case 1:22-cv-01248-CJB (in the U.S. District Court for the District of Delaware).
Exhibit E-8 to Document filed Jun. 30, 2023, "Specified Technologies Inc.'s Invalidity Contentions" in Case 1:22-cv-01248-CJB (in the U.S. District Court for the District of Delaware).
Exhibit E-9 to Document filed Jun. 30, 2023, "Specified Technologies Inc.'s Invalidity Contentions" in Case 1:22-cv-01248-CJB (in the U.S. District Court for the District of Delaware).
Exhibit E-10 to Document filed Jun. 30, 2023, "Specified Technologies Inc.'s Invalidity Contentions" in Case 1:22-cv-01248-CJB (in the U.S. District Court for the District of Delaware).
Exhibit E-11 to Document filed Jun. 30, 2023, "Specified Technologies Inc.'s Invalidity Contentions" in Case 1:22-cv-01248-CJB (in the U.S. District Court for the District of Delaware).
Exhibit E-12 to Document filed Jun. 30, 2023, "Specified Technologies Inc.'s Invalidity Contentions" in Case 1:22-cv-01248-CJB (in the U.S. District Court for the District of Delaware).
Exhibit E-13 to Document filed Jun. 30, 2023, "Specified Technologies Inc.'s Invalidity Contentions" in Case 1:22-cv-01248-CJB (in the U.S. District Court for the District of Delaware).
Exhibit E-14 to Document filed Jun. 30, 2023, "Specified Technologies Inc.'s Invalidity Contentions" in Case 1:22-cv-01248-CJB (in the U.S. District Court for the District of Delaware).
Exhibit E-15 to Document filed Jun. 30, 2023, "Specified Technologies Inc.'s Invalidity Contentions" in Case 1:22-cv-01248-CJB (in the U.S. District Court for the District of Delaware).
Exhibit E-16 to Document filed Jun. 30, 2023, "Specified Technologies Inc.'s Invalidity Contentions" in Case 1:22-cv-01248-CJB (in the U.S. District Court for the District of Delaware).
Exhibit E-17 to Document filed Jun. 30, 2023, "Specified Technologies Inc.'s Invalidity Contentions" in Case 1:22-cv-01248-CJB (in the U.S. District Court for the District of Delaware).
Exhibit E-18 to Document filed Jun. 30, 2023, "Specified Technologies Inc.'s Invalidity Contentions" in Case 1:22-cv-01248-CJB (in the U.S. District Court for the District of Delaware).
Exhibit E-19 to Document filed Jun. 30, 2023, "Specified Technologies Inc.'s Invalidity Contentions" in Case 1:22-cv-01248-CJB (in the U.S. District Court for the District of Delaware).
Exhibit E-20 to Document filed Jun. 30, 2023, "Specified Technologies Inc.'s Invalidity Contentions" in Case 1:22-cv-01248-CJB (in the U.S. District Court for the District of Delaware).
Exhibit E-21 to Document filed Jun. 30, 2023, "Specified Technologies Inc.'s Invalidity Contentions" in Case 1:22-cv-01248-CJB (in the U.S. District Court for the District of Delaware).
Exhibit E-22 to Document filed Jun. 30, 2023, "Specified Technologies Inc.'s Invalidity Contentions" in Case 1:22-cv-01248-CJB (in the U.S. District Court for the District of Delaware).
Exhibit C-1 to Document filed Jun. 30, 2023, "Specified Technologies Inc.'s Invalidity Contentions" in Case 1:22-cv-01248-CJB (in the U.S. District Court for the District of Delaware).
Exhibit C-2 to Document filed Jun. 30, 2023, "Specified Technologies Inc.'s Invalidity Contentions" in Case 1:22-cv-01248-CJB (in the U.S. District Court for the District of Delaware).
Exhibit C-3 to Document filed Jun. 30, 2023, "Specified Technologies Inc.'s Invalidity Contentions" in Case 1:22-cv-01248-CJB (in the U.S. District Court for the District of Delaware).
Exhibit C-4 to Document filed Jun. 30, 2023, "Specified Technologies Inc.'s Invalidity Contentions" in Case 1:22-cv-01248-CJB (in the U.S. District Court for the District of Delaware).
Exhibit C-5 to Document filed Jun. 30, 2023, "Specified Technologies Inc.'s Invalidity Contentions" in Case 1:22-cv-01248-CJB (in the U.S. District Court for the District of Delaware).
Exhibit C-6 to Document filed Jun. 30, 2023, "Specified Technologies Inc.'s Invalidity Contentions" in Case 1:22-cv-01248-CJB (in the U.S. District Court for the District of Delaware).
Exhibit C-7 to Document filed Jun. 30, 2023, "Specified Technologies Inc.'s Invalidity Contentions" in Case 1:22-cv-01248-CJB (in the U.S. District Court for the District of Delaware).
Exhibit C-8 to Document filed Jun. 30, 2023, "Specified Technologies Inc.'s Invalidity Contentions" in Case 1:22-cv-01248-CJB (in the U.S. District Court for the District of Delaware).
Exhibit C-9 to Document filed Jun. 30, 2023, "Specified Technologies Inc.'s Invalidity Contentions" in Case 1:22-cv-01248-CJB (in the U.S. District Court for the District of Delaware).
Exhibit C-10 to Document filed Jun. 30, 2023, "Specified Technologies Inc.'s Invalidity Contentions" in Case 1:22-cv-01248-CJB (in the U.S. District Court for the District of Delaware).
Exhibit C-11 to Document filed Jun. 30, 2023, "Specified Technologies Inc.'s Invalidity Contentions" in Case 1:22-cv-01248-CJB (in the U.S. District Court for the District of Delaware).
Exhibit C-12 to Document filed Jun. 30, 2023, "Specified Technologies Inc.'s Invalidity Contentions" in Case 1:22-cv-01248-CJB (in the U.S. District Court for the District of Delaware).
Exhibit C-13 to Document filed Jun. 30, 2023, "Specified Technologies Inc.'s Invalidity Contentions" in Case 1:22-cv-01248-CJB (in the U.S. District Court for the District of Delaware).
Exhibit C-14 to Document filed Jun. 30, 2023, "Specified Technologies Inc.'s Invalidity Contentions" in Case 1:22-cv-01248-CJB (in the U.S. District Court for the District of Delaware).
Exhibit C-15 to Document filed Jun. 30, 2023, "Specified Technologies Inc.'s Invalidity Contentions" in Case 1:22-cv-01248-CJB (in the U.S. District Court for the District of Delaware).
Exhibit C-16 to Document filed Jun. 30, 2023, "Specified Technologies Inc.'s Invalidity Contentions" in Case 1:22-cv-01248-CJB (in the U.S. District Court for the District of Delaware).
Exhibit C-17 to Document filed Jun. 30, 2023, "Specified Technologies Inc.'s Invalidity Contentions" in Case 1:22-cv-01248-CJB (in the U.S. District Court for the District of Delaware).
Exhibit C-18 to Document filed Jun. 30, 2023, "Specified Technologies Inc.'s Invalidity Contentions" in Case 1:22-cv-01248-CJB (in the U.S. District Court for the District of Delaware).
Exhibit C-19 to Document filed Jun. 30, 2023, "Specified Technologies Inc.'s Invalidity Contentions" in Case 1:22-cv-01248-CJB (in the U.S. District Court for the District of Delaware).
Exhibit C-20 to Document filed Jun. 30, 2023, "Specified Technologies Inc.'s Invalidity Contentions" in Case 1:22-cv-01248-CJB (in the U.S. District Court for the District of Delaware).
Exhibit C-21 to Document filed Jun. 30, 2023, "Specified Technologies Inc.'s Invalidity Contentions" in Case 1:22-cv-01248-CJB (in the U.S. District Court for the District of Delaware).
Exhibit C-22 to Document filed Jun. 30, 2023, "Specified Technologies Inc.'s Invalidity Contentions" in Case 1:22-cv-01248-CJB (in the U.S. District Court for the District of Delaware).
Exhibit C-23 to Document filed Jun. 30, 2023, "Specified Technologies Inc.'s Invalidity Contentions" in Case 1:22-cv-01248-CJB (in the U.S. District Court for the District of Delaware).
Exhibit C-24 to Document filed Jun. 30, 2023, "Specified Technologies Inc.'s Invalidity Contentions" in Case 1:22-cv-01248-CJB (in the U.S. District Court for the District of Delaware).
Exhibit J to Document filed Jun. 30, 2023, "Specified Technologies Inc.'s Invalidity Contentions" in Case 1:22-cv-01248-CJB (in the U.S. District Court for the District of Delaware).
Exhibit K to Document filed Jun. 30, 2023, "Specified Technologies Inc.'s Invalidity Contentions" in Case 1:22-cv-01248-CJB (in the U.S. District Court for the District of Delaware).
Exhibit L to Document filed Jun. 30, 2023, "Specified Technologies Inc.'s Invalidity Contentions" in Case 1:22-cv-01248-CJB (in the U.S. District Court for the District of Delaware).
Exhibit M to Document filed Jun. 30, 2023, "Specified Technologies Inc.'s Invalidity Contentions" in Case 1:22-cv-01248-CJB (in the U.S. District Court for the District of Delaware).
Exhibit N to Document filed Jun. 30, 2023, "Specified Technologies Inc.'s Invalidity Contentions" in Case 1:22-cv-01248-CJB (in the U.S. District Court for the District of Delaware).
Exhibit O to Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Exhibit P to Document filed Jun. 30, 2023, "Specified Technologies Inc.'s Invalidity Contentions" in Case 1:22-cv-01248-CJB (in the U.S. District Court for the District of Delaware).
Exhibit Q to Document filed Jun. 30, 2023, "Specified Technologies Inc.'s Invalidity Contentions" in Case 1:22-cv-01248-CJB (in the U.S. District Court for the District of Delaware).
Document 1248HILTI0000473-0001118 filed with Document filed Jun. 30, 2023, "Specified Technologies Inc.'s Invalidity Contentions" in Case 1:22-cv-01248-CJB (in the U.S. District Court for the District of Delaware).
Document STI-1248-000018-000019 filed with Document filed Jun. 30, 2023, "Specified Technologies Inc.'s Invalidity Contentions" in Case 1:22-cv-01248-CJB (in the U.S. District Court for the District of Delaware).
Document STI-1248-000025 filed with Document filed Jun. 30, 2023, "Specified Technologies Inc.'s Invalidity Contentions" in Case 1:22-cv-01248-CJB (in the U.S. District Court for the District of Delaware).
Document STI-1248-000081 filed with Document filed Jun. 30, 2023, "Specified Technologies Inc.'s Invalidity Contentions" in Case 1:22-cv-01248-CJB (in the U.S. District Court for the District of Delaware).
Document STI-1248-000855-000862 filed with Document filed Jun. 30, 2023, "Specified Technologies Inc.'s Invalidity Contentions" in Case 1:22-cv-01248-CJB (in the U.S. District Court for the District of Delaware).
Document STI-1248-004141-004145 filed with Document filed Jun. 30, 2023, "Specified Technologies Inc.'s Invalidity Contentions" in Case 1:22-cv-01248-CJB (in the U.S. District Court for the District of Delaware).
Screen shots from STI-1248-004160, filed with Document filed Jun. 30, 2023, "Specified Technologies Inc.'s Invalidity Contentions" in Case 1:22-cv-01248-CJB (in the U.S. District Court for the District of Delaware).
Document STI-1248-004161-004168 filed with Document filed Jun. 30, 2023, "Specified Technologies Inc.'s Invalidity Contentions" in Case 1:22-cv-01248-CJB (in the U.S. District Court for the District of Delaware).
Document STI-1248-004270-004273 filed with Document filed Jun. 30, 2023, "Specified Technologies Inc.'s Invalidity Contentions" in Case 1:22-cv-01248-CJB (in the U.S. District Court for the District of Delaware).
Document STI-1248-004274-004311 filed with Document filed Jun. 30, 2023, "Specified Technologies Inc.'s Invalidity Contentions" in Case 1:22-cv-01248-CJB (in the U.S. District Court for the District of Delaware).
Document STI-1248-004312-004323 filed with Document filed Jun. 30, 2023, "Specified Technologies Inc.'s Invalidity Contentions" in Case 1:22-cv-01248-CJB (in the U.S. District Court for the District of Delaware).
Document STI-1248-004415-004420 filed with Document filed Jun. 30, 2023, "Specified Technologies Inc.'s Invalidity Contentions" in Case 1:22-cv-01248-CJB (in the U.S. District Court for the District of Delaware).
Document STI-1248-004421-004427 filed with Document filed Jun. 30, 2023, "Specified Technologies Inc.'s Invalidity Contentions" in Case 1:22-cv-01248-CJB (in the U.S. District Court for the District of Delaware).
Document STI-1248-004435-004436 filed with Document filed Jun. 30, 2023, "Specified Technologies Inc.'s Invalidity Contentions" in Case 1:22-cv-01248-CJB (in the U.S. District Court for the District of Delaware).
Document STI-1248-004491-004494 filed with Document filed Jun. 30, 2023, "Specified Technologies Inc.'s Invalidity Contentions" in Case 1:22-cv-01248-CJB (in the U.S. District Court for the District of Delaware).
Document STI-1248-004502-004545 filed with Document filed Jun. 30, 2023, "Specified Technologies Inc.'s Invalidity Contentions" in Case 1:22-cv-01248-CJB (in the U.S. District Court for the District of Delaware).
Document STI-1248-004546-004548 filed with Document filed Jun. 30, 2023, "Specified Technologies Inc.'s Invalidity Contentions" in Case 1:22-cv-01248-CJB (in the U.S. District Court for the District of Delaware).
Document STI-1248-004549-004592 filed with Document filed Jun. 30, 2023, "Specified Technologies Inc.'s Invalidity Contentions" in Case 1:22-cv-01248-CJB (in the U.S. District Court for the District of Delaware).
Document STI-1248-004593-004625 filed with Document filed Jun. 30, 2023, "Specified Technologies Inc.'s Invalidity Contentions" in Case 1:22-cv-01248-CJB (in the U.S. District Court for the District of Delaware).
Document STI-1248-004626-004634 filed with Document filed Jun. 30, 2023, "Specified Technologies Inc.'s Invalidity Contentions" in Case 1:22-cv-01248-CJB (in the U.S. District Court for the District of Delaware).
Document STI-1248-004635-004645 filed with Document filed Jun. 30, 2023, "Specified Technologies Inc.'s Invalidity Contentions" in Case 1:22-cv-01248-CJB (in the U.S. District Court for the District of Delaware).
Document STI-1248-004646-004652 filed with Document filed Jun. 30, 2023, "Specified Technologies Inc.'s Invalidity Contentions" in Case 1:22-cv-01248-CJB (in the U.S. District Court for the District of Delaware).
Document STI-1248-004653-004663 filed with Document filed Jun. 30, 2023, "Specified Technologies Inc.'s Invalidity Contentions" in Case 1:22-cv-01248-CJB (in the U.S. District Court for the District of Delaware).
Document STI-1248-004664-004682 filed with Document filed Jun. 30, 2023, "Specified Technologies Inc.'s Invalidity Contentions" in Case 1:22-cv-01248-CJB (in the U.S. District Court for the District of Delaware).
Document STI-1248-004683-004695 filed with Document filed Jun. 30, 2023, "Specified Technologies Inc.'s Invalidity Contentions" in Case 1:22-cv-01248-CJB (in the U.S. District Court for the District of Delaware).
Document STI-1248-004696-004700 filed with Document filed Jun. 30, 2023, "Specified Technologies Inc.'s Invalidity Contentions" in Case 1:22-cv-01248-CJB (in the U.S. District Court for the District of Delaware).
Document STI-1248-004701-004714 filed with Document filed Jun. 30, 2023, "Specified Technologies Inc.'s Invalidity Contentions" in Case 1:22-cv-01248-CJB (in the U.S. District Court for the District of Delaware).
Document STI-1248-004715-004720 filed with Document filed Jun. 30, 2023, "Specified Technologies Inc.'s Invalidity Contentions" in Case 1:22-cv-01248-CJB (in the U.S. District Court for the District of Delaware).
Document STI-1248-004721-004730 filed with Document filed Jun. 30, 2023, "Specified Technologies Inc.'s Invalidity Contentions" in Case 1:22-cv-01248-CJB (in the U.S. District Court for the District of Delaware).
Document STI-1248-004731-004738 filed with Document filed Jun. 30, 2023, "Specified Technologies Inc.'s Invalidity Contentions" in Case 1:22-cv-01248-CJB (in the U.S. District Court for the District of Delaware).
Document STI-1248-004739-004744 filed with Document filed Jun. 30, 2023, "Specified Technologies Inc.'s Invalidity Contentions" in Case 1:22-cv-01248-CJB (in the U.S. District Court for the District of Delaware).
Document STI-1248-004745-004752 filed with Document filed Jun. 30, 2023, "Specified Technologies Inc.'s Invalidity Contentions" in Case 1:22-cv-01248-CJB (in the U.S. District Court for the District of Delaware).
Document STI-1248-004753-004765 filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-004766-004772 filed with Document filed Jun. 30, 2023, "Specified Technologies Inc.'s Invalidity Contentions" in Case 1:22-cv-01248-CJB (in the U.S. District Court for the District of Delaware).
Document STI-1248-004773-004789 filed with Document filed Jun. 30, 2023, "Specified Technologies Inc.'s Invalidity Contentions" in Case 1:22-cv-01248-CJB (in the U.S. District Court for the District of Delaware).
Document STI-1248-004790-004818 filed with Document filed Jun. 30, 2023, "Specified Technologies Inc.'s Invalidity Contentions" in Case 1:22-cv-01248-CJB (in the U.S. District Court for the District of Delaware).
Document STI-1248-004819-004827 filed with Document filed Jun. 30, 2023, "Specified Technologies Inc.'s Invalidity Contentions" in Case 1:22-cv-01248-CJB (in the U.S. District Court for the District of Delaware).
Document STI-1248-004828-004836 filed with Document filed Jun. 30, 2023, "Specified Technologies Inc.'s Invalidity Contentions" in Case 1:22-cv-01248-CJB (in the U.S. District Court for the District of Delaware).
Document STI-1248-004837-004850 filed with Document filed Jun. 30, 2023, "Specified Technologies Inc.'s Invalidity Contentions" in Case 1:22-cv-01248-CJB (in the U.S. District Court for the District of Delaware).
Document STI-1248-004851-004858 filed with Document filed Jun. 30, 2023, "Specified Technologies Inc.'s Invalidity Contentions" in Case 1:22-cv-01248-CJB (in the U.S. District Court for the District of Delaware).
Document STI-1248-004859-004867 filed with Document filed Jun. 30, 2023, "Specified Technologies Inc.'s Invalidity Contentions" in Case 1:22-cv-01248-CJB (in the U.S. District Court for the District of Delaware).
Document STI-1248-004868-004873 filed with Document filed Jun. 30, 2023, "Specified Technologies Inc.'s Invalidity Contentions" in Case 1:22-cv-01248-CJB (in the U.S. District Court for the District of Delaware).
Document STI-1248-004874-004878 filed with Document filed Jun. 30, 2023, "Specified Technologies Inc.'s Invalidity Contentions" in Case 1:22-cv-01248-CJB (in the U.S. District Court for the District of Delaware).
Document STI-1248-004879-004890 filed with Document filed Jun. 30, 2023, "Specified Technologies Inc.'s Invalidity Contentions" in Case 1:22-cv-01248-CJB (in the U.S. District Court for the District of Delaware).
Document STI-1248-004891-004901 filed with Document filed Jun. 30, 2023, "Specified Technologies Inc.'s Invalidity Contentions" in Case 1:22-cv-01248-CJB (in the U.S. District Court for the District of Delaware).
Document STI-1248-004902-004908 filed with Document filed Jun. 30, 2023, "Specified Technologies Inc.'s Invalidity Contentions" in Case 1:22-cv-01248-CJB (in the U.S. District Court for the District of Delaware).
Document STI-1248-004909-004919 filed with Document filed Jun. 30, 2023, "Specified Technologies Inc.'s Invalidity Contentions" in Case 1:22-cv-01248-CJB (in the U.S. District Court for the District of Delaware).
Document STI-1248-004920-004932 filed with Document filed Jun. 30, 2023, "Specified Technologies Inc.'s Invalidity Contentions" in Case 1:22-cv-01248-CJB (in the U.S. District Court for the District of Delaware).
Document STI-1248-004933-004943 filed with Document filed Jun. 30, 2023, "Specified Technologies Inc.'s Invalidity Contentions" in Case 1:22-cv-01248-CJB (in the U.S. District Court for the District of Delaware).
Document STI-1248-004944-004954 filed with Document filed Jun. 30, 2023, "Specified Technologies Inc.'s Invalidity Contentions" in Case 1:22-cv-01248-CJB (in the U.S. District Court for the District of Delaware).
Document STI-1248-004955-004977 filed with Document filed Jun. 30, 2023, "Specified Technologies Inc.'s Invalidity Contentions" in Case 1:22-cv-01248-CJB (in the U.S. District Court for the District of Delaware).
Document STI-1248-004978-004981 filed with Document filed Jun. 30, 2023, "Specified Technologies Inc.'s Invalidity Contentions" in Case 1:22-cv-01248-CJB (in the U.S. District Court for the District of Delaware).
Document STI-1248-004982-005000 filed with Document filed Jun. 30, 2023, "Specified Technologies Inc.'s Invalidity Contentions" in Case 1:22-cv-01248-CJB (in the U.S. District Court for the District of Delaware).
Document STI-1248-005001-005012 filed with Document filed Jun. 30, 2023, "Specified Technologies Inc.'s Invalidity Contentions" in Case 1:22-cv-01248-CJB (in the U.S. District Court for the District of Delaware).
Document STI-1248-005013-005037 filed with Document filed Jun. 30, 2023, "Specified Technologies Inc.'s Invalidity Contentions" in Case 1:22-cv-01248-CJB (in the U.S. District Court for the District of Delaware).
Document STI-1248-005038-005062 filed with Document filed Jun. 30, 2023, "Specified Technologies Inc.'s Invalidity Contentions" in Case 1:22-cv-01248-CJB (in the U.S. District Court for the District of Delaware).
Document STI-1248-005063-005075 filed with Document filed Jun. 30, 2023, "Specified Technologies Inc.'s Invalidity Contentions" in Case 1:22-cv-01248-CJB (in the U.S. District Court for the District of Delaware).
Document STI-1248-005076-005080 filed with Document filed Jun. 30, 2023, "Specified Technologies Inc.'s Invalidity Contentions" in Case 1:22-cv-01248-CJB (in the U.S. District Court for the District of Delaware).
Document STI-1248-005081-005083 filed with Document filed Jun. 30, 2023, "Specified Technologies Inc.'s Invalidity Contentions" in Case 1:22-cv-01248-CJB (in the U.S. District Court for the District of Delaware).
Document STI-1248-005084-005089 filed with Document filed Jun. 30, 2023, "Specified Technologies Inc.'s Invalidity Contentions" in Case 1:22-cv-01248-CJB (in the U.S. District Court for the District of Delaware).
Document STI-1248-005090-005120 filed with Document filed Jun. 30, 2023, "Specified Technologies Inc.'s Invalidity Contentions" in Case 1:22-cv-01248-CJB (in the U.S. District Court for the District of Delaware).
Document STI-1248-005121-005137 filed with Document filed Jun. 30, 2023, "Specified Technologies Inc.'s Invalidity Contentions" in Case 1:22-cv-01248-CJB (in the U.S. District Court for the District of Delaware).
Document STI-1248-005138-005158 filed with Document filed Jun. 30, 2023, "Specified Technologies Inc.'s Invalidity Contentions" in Case 1:22-cv-01248-CJB (in the U.S. District Court for the District of Delaware).
Document STI-1248-005159-005164 filed with Document filed Jun. 30, 2023, "Specified Technologies Inc.'s Invalidity Contentions" in Case 1:22-cv-01248-CJB (in the U.S. District Court for the District of Delaware).
Document STI-1248-005165-005183 filed with Document filed Jun. 30, 2023, "Specified Technologies Inc.'s Invalidity Contentions" in Case 1:22-cv-01248-CJB (in the U.S. District Court for the District of Delaware).
Document STI-1248-005184-005203 filed with Document filed Jun. 30, 2023, "Specified Technologies Inc.'s Invalidity Contentions" in Case 1:22-cv-01248-CJB (in the U.S. District Court for the District of Delaware).
Document STI-1248-005204-005210 filed with Document filed Jun. 30, 2023, "Specified Technologies Inc.'s Invalidity Contentions" in Case 1:22-cv-01248-CJB (in the U.S. District Court for the District of Delaware).
Document STI-1248-005211-005224 filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-005225-005229 filed with Document filed Jun. 30, 2023, "Specified Technologies Inc.'s Invalidity Contentions" in Case 1:22-cv-01248-CJB (in the U.S. District Court for the District of Delaware).
Document STI-1248-005230-005253 filed with Document filed Jun. 30, 2023, "Specified Technologies Inc.'s Invalidity Contentions" in Case 1:22-cv-01248-CJB (in the U.S. District Court for the District of Delaware).
Document STI-1248-005254-005262 filed with Document filed Jun. 30, 2023, "Specified Technologies Inc.'s Invalidity Contentions" in Case 1:22-cv-01248-CJB (in the U.S. District Court for the District of Delaware).
Document STI-1248-005263-005275 filed with Document filed Jun. 30, 2023, "Specified Technologies Inc.'s Invalidity Contentions" in Case 1:22-cv-01248-CJB (in the U.S. District Court for the District of Delaware).
Document STI-1248-005276-005286 filed with Document filed Jun. 30, 2023, "Specified Technologies Inc.'s Invalidity Contentions" in Case 1:22-cv-01248-CJB (in the U.S. District Court for the District of Delaware).
Document STI-1248-005287-005309 filed with Document filed Jun. 30, 2023, "Specified Technologies Inc.'s Invalidity Contentions" in Case 1:22-cv-01248-CJB (in the U.S. District Court for the District of Delaware).
Document STI-1248-005310-005320 filed with Document filed Jun. 30, 2023, "Specified Technologies Inc.'s Invalidity Contentions" in Case 1:22-cv-01248-CJB (in the U.S. District Court for the District of Delaware).
Document STI-1248-005321-005329 filed with Document filed Jun. 30, 2023, "Specified Technologies Inc.'s Invalidity Contentions" in Case 1:22-cv-01248-CJB (in the U.S. District Court for the District of Delaware).
Document STI-1248-005330-005335 filed with Document filed Jun. 30, 2023, "Specified Technologies Inc.'s Invalidity Contentions" in Case 1:22-cv-01248-CJB (in the U.S. District Court for the District of Delaware).
Document STI-1248-005336-005339 filed with Document filed Jun. 30, 2023, "Specified Technologies Inc.'s Invalidity Contentions" in Case 1:22-cv-01248-CJB (in the U.S. District Court for the District of Delaware).
Document STI-1248-005340-005345 filed with Document filed Jun. 30, 2023, "Specified Technologies Inc.'s Invalidity Contentions" in Case 1:22-cv-01248-CJB (in the U.S. District Court for the District of Delaware).
Document STI-1248-005346-005353 filed with Document filed Jun. 30, 2023, "Specified Technologies Inc.'s Invalidity Contentions" in Case 1:22-cv-01248-CJB (in the U.S. District Court for the District of Delaware).
Document STI-1248-005354-005356 filed with Document filed Jun. 30, 2023, "Specified Technologies Inc.'s Invalidity Contentions" in Case 1:22-cv-01248-CJB (in the U.S. District Court for the District of Delaware).
Document STI-1248-005357-005359 filed with Document filed Jun. 30, 2023, "Specified Technologies Inc.'s Invalidity Contentions" in Case 1:22-cv-01248-CJB (in the U.S. District Court for the District of Delaware).
Document STI-1248-005360-005361 filed with Document filed Jun. 30, 2023, "Specified Technologies Inc.'s Invalidity Contentions" in Case 1:22-cv-01248-CJB (in the U.S. District Court for the District of Delaware).
Document STI-1248-005755 filed with Document filed Jun. 30, 2023, "Specified Technologies Inc.'s Invalidity Contentions" in Case 1:22-cv-01248-CJB (in the U.S. District Court for the District of Delaware).
Document STI-1248-005759-005765 filed with Document filed Jun. 30, 2023, "Specified Technologies Inc.'s Invalidity Contentions" in Case 1:22-cv-01248-CJB (in the U.S. District Court for the District of Delaware).
Document STI-1248-000075-000077, filed with Document filed Jun. 30, 2023, "Specified Technologies Inc.'s Invalidity Contentions" in Case 1:22-cv-01248-CJB (in the U.S. District Court for the District of Delaware).
Document STI-1248-000078-000080, filed with Document filed Jun. 30, 2023, "Specified Technologies Inc.'s Invalidity Contentions" in Case 1:22-cv-01248-CJB (in the U.S. District Court for the District of Delaware).
Document STI-1248-000759, filed with Document filed Jun. 30, 2023, "Specified Technologies Inc.'s Invalidity Contentions" in Case 1:22-cv-01248-CJB (in the U.S. District Court for the District of Delaware).
Document STI-1248-000839-000842, filed with Document filed Jun. 30, 2023, "Specified Technologies Inc.'s Invalidity Contentions" in Case 1:22-cv-01248-CJB (in the U.S. District Court for the District of Delaware).
Document STI-1248-000843-000852, filed with Document filed Jun. 30, 2023, "Specified Technologies Inc.'s Invalidity Contentions" in Case 1:22-cv-01248-CJB (in the U.S. District Court for the District of Delaware).
Document STI-1248-000987, filed with Document filed Jun. 30, 2023, "Specified Technologies Inc.'s Invalidity Contentions" in Case 1:22-cv-01248-CJB (in the U.S. District Court for the District of Delaware).
Document STI-1248-001780, filed with Document filed Jun. 30, 2023, "Specified Technologies Inc.'s Invalidity Contentions" in Case 1:22-cv-01248-CJB (in the U.S. District Court for the District of Delaware).
Document STI-1248-001781, filed with Document filed Jun. 30, 2023, "Specified Technologies Inc.'s Invalidity Contentions" in Case 1:22-cv-01248-CJB (in the U.S. District Court for the District of Delaware).
Document STI-1248-001782, filed with Document filed Jun. 30, 2023, "Specified Technologies Inc.'s Invalidity Contentions" in Case 1:22-cv-01248-CJB (in the U.S. District Court for the District of Delaware).
Document STI-1248-001804, filed with Document filed Jun. 30, 2023, "Specified Technologies Inc.'s Invalidity Contentions" in Case 1:22-cv-01248-CJB (in the U.S. District Court for the District of Delaware).
Document STI-1248-003735, filed with Document filed Jun. 30, 2023, "Specified Technologies Inc.'s Invalidity Contentions" in Case 1:22-cv-01248-CJB (in the U.S. District Court for the District of Delaware).
Document STI-1248-4148-4159, filed with Document filed Jun. 30, 2023, "Specified Technologies Inc.'s Invalidity Contentions" in Case 1:22-cv-01248-CJB (in the U.S. District Court for the District of Delaware).
Document STI-1248-4201, filed with Document filed Jun. 30, 2023, "Specified Technologies Inc.'s Invalidity Contentions" in Case 1:22-cv-01248-CJB (in the U.S. District Court for the District of Delaware).
Document STI-1248-4202, filed with Document filed Jun. 30, 2023, "Specified Technologies Inc.'s Invalidity Contentions" in Case 1:22-cv-01248-CJB (in the U.S. District Court for the District of Delaware).
Document STI-1248-4203, filed with Document filed Jun. 30, 2023, "Specified Technologies Inc.'s Invalidity Contentions" in Case 1:22-cv-01248-CJB (in the U.S. District Court for the District of Delaware).
Document STI-1248-4207, filed with Document filed Jun. 30, 2023, "Specified Technologies Inc.'s Invalidity Contentions" in Case 1:22-cv-01248-CJB (in the U.S. District Court for the District of Delaware).
Document STI-1248-4211, filed with Document filed Jun. 30, 2023, "Specified Technologies Inc.'s Invalidity Contentions" in Case 1:22-cv-01248-CJB (in the U.S. District Court for the District of Delaware).
Document STI-1248-4215, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-4218, filed with Document filed Jun. 30, 2023, "Specified Technologies Inc.'s Invalidity Contentions" in Case 1:22-cv-01248-CJB (in the U.S. District Court for the District of Delaware).
Document STI-1248-4219, filed with Document filed Jun. 30, 2023, "Specified Technologies Inc.'s Invalidity Contentions" in Case 1:22-cv-01248-CJB (in the U.S. District Court for the District of Delaware).
Document STI-1248-4229, filed with Document filed Jun. 30, 2023, "Specified Technologies Inc.'s Invalidity Contentions" in Case 1:22-cv-01248-CJB (in the U.S. District Court for the District of Delaware).
Document STI-1248-4233, filed with Document filed Jun. 30, 2023, "Specified Technologies Inc.'s Invalidity Contentions" in Case 1:22-cv-01248-CJB (in the U.S. District Court for the District of Delaware).
Document STI-1248-4236, filed with Document filed Jun. 30, 2023, "Specified Technologies Inc.'s Invalidity Contentions" in Case 1:22-cv-01248-CJB (in the U.S. District Court for the District of Delaware).
Document STI-1248-4260, filed with Document filed Jun. 30, 2023, "Specified Technologies Inc.'s Invalidity Contentions" in Case 1:22-cv-01248-CJB (in the U.S. District Court for the District of Delaware).
Transcript and screen shots from document STI-1248-005599, filed with Document filed Jun. 30, 2023, "Specified Technologies Inc.'s Invalidity Contentions" in Case 1:22-cv-01248-CJB (in the U.S. District Court for the District of Delaware).
Transcript and screen shots from document STI-1248-005600, filed with Document filed Jun. 30, 2023, "Specified Technologies Inc.'s Invalidity Contentions" in Case 1:22-cv-01248-CJB (in the U.S. District Court for the District of Delaware).
Transcript and screen shots from document STI-1248-005601, filed with Document filed Jun. 30, 2023, "Specified Technologies Inc.'s Invalidity Contentions" in Case 1:22-cv-01248-CJB (in the U.S. District Court for the District of Delaware).
Screen shots from document STI-1248-005602, filed with Document filed Jun. 30, 2023, "Specified Technologies Inc.'s Invalidity Contentions" in Case 1:22-cv-01248-CJB (in the U.S. District Court for the District of Delaware).
Transcript and screen shots from document STI-1248-005603, filed with Document filed Jun. 30, 2023, "Specified Technologies Inc.'s Invalidity Contentions" in Case 1:22-cv-01248-CJB (in the U.S. District Court for the District of Delaware).
Transcript and screen shots from document STI-1248-005604, filed with Document filed Jun. 30, 2023, "Specified Technologies Inc.'s Invalidity Contentions" in Case 1:22-cv-01248-CJB (in the U.S. District Court for the District of Delaware).
Transcript and screen shots from document STI-1248-005605, filed with Document filed Jun. 30, 2023, "Specified Technologies Inc.'s Invalidity Contentions" in Case 1:22-cv-01248-CJB (in the U.S. District Court for the District of Delaware).
Transcript and screen shots from document STI-1248-005606, filed with Document filed Jun. 30, 2023, "Specified Technologies Inc.'s Invalidity Contentions" in Case 1:22-cv-01248-CJB (in the U.S. District Court for the District of Delaware).
Screen shots from document STI-1248-005607, filed with Document filed Jun. 30, 2023, "Specified Technologies Inc.'s Invalidity Contentions" in Case 1:22-cv-01248-CJB (in the U.S. District Court for the District of Delaware).
Screen shots from document STI-1248-005608, filed with Document filed Jun. 30, 2023, "Specified Technologies Inc.'s Invalidity Contentions" in Case 1:22-cv-01248-CJB (in the U.S. District Court for the District of Delaware).
Document STI-1248-5748, filed with Document filed Jun. 30, 2023, "Specified Technologies Inc.'s Invalidity Contentions" in Case 1:22-cv-01248-CJB (in the U.S. District Court for the District of Delaware).
Document STI-1248-5749, filed with Document filed Jun. 30, 2023, "Specified Technologies Inc.'s Invalidity Contentions" in Case 1:22-cv-01248-CJB (in the U.S. District Court for the District of Delaware).
Document STI-1248-5750, filed with Document filed Jun. 30, 2023, "Specified Technologies Inc.'s Invalidity Contentions" in Case 1:22-cv-01248-CJB (in the U.S. District Court for the District of Delaware).
Document STI-1248-5751, filed with Document filed Jun. 30, 2023, "Specified Technologies Inc.'s Invalidity Contentions" in Case 1:22-cv-01248-CJB (in the U.S. District Court for the District of Delaware).
Document STI-1248-5752, filed with Document filed Jun. 30, 2023, "Specified Technologies Inc.'s Invalidity Contentions" in Case 1:22-cv-01248-CJB (in the U.S. District Court for the District of Delaware).
Document STI-1248-5753, filed with Document filed Jun. 30, 2023, "Specified Technologies Inc.'s Invalidity Contentions" in Case 1:22-cv-01248-CJB (in the U.S. District Court for the District of Delaware).
Document STI-1248-5754, filed with Document filed Jun. 30, 2023, "Specified Technologies Inc.'s Invalidity Contentions" in Case 1:22-cv-01248-CJB (in the U.S. District Court for the District of Delaware).
Document STI-1248-5756, filed with Document filed Jun. 30, 2023, "Specified Technologies Inc.'s Invalidity Contentions" in Case 1:22-cv-01248-CJB (in the U.S. District Court for the District of Delaware).
Document STI-1248-5757, filed with Document filed Jun. 30, 2023, "Specified Technologies Inc.'s Invalidity Contentions" in Case 1:22-cv-01248-CJB (in the U.S. District Court for the District of Delaware).
Document STI-1248-5758, filed with Document filed Jun. 30, 2023, "Specified Technologies Inc.'s Invalidity Contentions" in Case 1:22-cv-01248-CJB (in the U.S. District Court for the District of Delaware).
Document STI-1248-000040, filed with Document filed Jun. 30, 2023, "Specified Technologies Inc.'s Invalidity Contentions" in Case 1:22-cv-01248-CJB (in the U.S. District Court for the District of Delaware).
Document STI-1248-000041, filed with Document filed Jun. 30, 2023, "Specified Technologies Inc.'s Invalidity Contentions" in Case 1:22-cv-01248-CJB (in the U.S. District Court for the District of Delaware).
Document STI-1248-000054, filed with Document filed Jun. 30, 2023, "Specified Technologies Inc.'s Invalidity Contentions" in Case 1:22-cv-01248-CJB (in the U.S. District Court for the District of Delaware).
Document STI-1248-000055, filed with Document filed Jun. 30, 2023, "Specified Technologies Inc.'s Invalidity Contentions" in Case 1:22-cv-01248-CJB (in the U.S. District Court for the District of Delaware).
Document STI-1248-000056, filed with Document filed Jun. 30, 2023, "Specified Technologies Inc.'s Invalidity Contentions" in Case 1:22-cv-01248-CJB (in the U.S. District Court for the District of Delaware).
Document STI-1248-000071, filed with Document filed Jun. 30, 2023, "Specified Technologies Inc.'s Invalidity Contentions" in Case 1:22-cv-01248-CJB (in the U.S. District Court for the District of Delaware).
Document STI-1248-000720, filed with Document filed Jun. 30, 2023, "Specified Technologies Inc.'s Invalidity Contentions" in Case 1:22-cv-01248-CJB (in the U.S. District Court for the District of Delaware).
Document STI-1248-000760, filed with Document filed Jun. 30, 2023, "Specified Technologies Inc.'s Invalidity Contentions" in Case 1:22-cv-01248-CJB (in the U.S. District Court for the District of Delaware).
Document STI-1248-000786, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-000810, filed with Document filed Jun. 30, 2023, "Specified Technologies Inc.'s Invalidity Contentions" in Case 1:22-cv-01248-CJB (in the U.S. District Court for the District of Delaware).
Document STI-1248-000826, filed with Document filed Jun. 30, 2023, "Specified Technologies Inc.'s Invalidity Contentions" in Case 1:22-cv-01248-CJB (in the U.S. District Court for the District of Delaware).
Document STI-1248-000864, filed with Document filed Jun. 30, 2023, "Specified Technologies Inc.'s Invalidity Contentions" in Case 1:22-cv-01248-CJB (in the U.S. District Court for the District of Delaware).
Document STI-1248-000889, filed with Document filed Jun. 30, 2023, "Specified Technologies Inc.'s Invalidity Contentions" in Case 1:22-cv-01248-CJB (in the U.S. District Court for the District of Delaware).
Document STI-1248-000913, filed with Document filed Jun. 30, 2023, "Specified Technologies Inc.'s Invalidity Contentions" in Case 1:22-cv-01248-CJB (in the U.S. District Court for the District of Delaware).
Document STI-1248-000960, filed with Document filed Jun. 30, 2023, "Specified Technologies Inc.'s Invalidity Contentions" in Case 1:22-cv-01248-CJB (in the U.S. District Court for the District of Delaware).
Document STI-1248-000974, filed with Document filed Jun. 30, 2023, "Specified Technologies Inc.'s Invalidity Contentions" in Case 1:22-cv-01248-CJB (in the U.S. District Court for the District of Delaware).
Document STI-1248-000975, filed with Document filed Jun. 30, 2023, "Specified Technologies Inc.'s Invalidity Contentions" in Case 1:22-cv-01248-CJB (in the U.S. District Court for the District of Delaware).
Document STI-1248-000988, filed with Document filed Jun. 30, 2023, "Specified Technologies Inc.'s Invalidity Contentions" in Case 1:22-cv-01248-CJB (in the U.S. District Court for the District of Delaware).
Document STI-1248-000989, filed with Document filed Jun. 30, 2023, "Specified Technologies Inc.'s Invalidity Contentions" in Case 1:22-cv-01248-CJB (in the U.S. District Court for the District of Delaware).
Document STI-1248-000990, filed with Document filed Jun. 30, 2023, "Specified Technologies Inc.'s Invalidity Contentions" in Case 1:22-cv-01248-CJB (in the U.S. District Court for the District of Delaware).
Document STI-1248-000991, filed with Document filed Jun. 30, 2023, "Specified Technologies Inc.'s Invalidity Contentions" in Case 1:22-cv-01248-CJB (in the U.S. District Court for the District of Delaware).
Document STI-1248-000992, filed with Document filed Jun. 30, 2023, "Specified Technologies Inc.'s Invalidity Contentions" in Case 1:22-cv-01248-CJB (in the U.S. District Court for the District of Delaware).
Document STI-1248-000993, filed with Document filed Jun. 30, 2023, "Specified Technologies Inc.'s Invalidity Contentions" in Case 1:22-cv-01248-CJB (in the U.S. District Court for the District of Delaware).
Document STI-1248-000994, filed with Document filed Jun. 30, 2023, "Specified Technologies Inc.'s Invalidity Contentions" in Case 1:22-cv-01248-CJB (in the U.S. District Court for the District of Delaware).
Document STI-1248-000996, filed with Document filed Jun. 30, 2023, "Specified Technologies Inc.'s Invalidity Contentions" in Case 1:22-cv-01248-CJB (in the U.S. District Court for the District of Delaware).
Document STI-1248-001038, filed with Document filed Jun. 30, 2023, "Specified Technologies Inc.'s Invalidity Contentions" in Case 1:22-cv-01248-CJB (in the U.S. District Court for the District of Delaware).
Document STI-1248-001039, filed with Document filed Jun. 30, 2023, "Specified Technologies Inc.'s Invalidity Contentions" in Case 1:22-cv-01248-CJB (in the U.S. District Court for the District of Delaware).
Document STI-1248-001091, filed with Document filed Jun. 30, 2023, "Specified Technologies Inc.'s Invalidity Contentions" in Case 1:22-cv-01248-CJB (in the U.S. District Court for the District of Delaware).
Document STI-1248-001701, filed with Document filed Jun. 30, 2023, "Specified Technologies Inc.'s Invalidity Contentions" in Case 1:22-cv-01248-CJB (in the U.S. District Court for the District of Delaware).
Document STI-1248-001702, filed with Document filed Jun. 30, 2023, "Specified Technologies Inc.'s Invalidity Contentions" in Case 1:22-cv-01248-CJB (in the U.S. District Court for the District of Delaware).
Document STI-1248-001703, filed with Document filed Jun. 30, 2023, "Specified Technologies Inc.'s Invalidity Contentions" in Case 1:22-cv-01248-CJB (in the U.S. District Court for the District of Delaware).
Document STI-1248-001704, filed with Document filed Jun. 30, 2023, "Specified Technologies Inc.'s Invalidity Contentions" in Case 1:22-cv-01248-CJB (in the U.S. District Court for the District of Delaware).
Document STI-1248-001705, filed with Document filed Jun. 30, 2023, "Specified Technologies Inc.'s Invalidity Contentions" in Case 1:22-cv-01248-CJB (in the U.S. District Court for the District of Delaware).
Document STI-1248-001805, filed with Document filed Jun. 30, 2023, "Specified Technologies Inc.'s Invalidity Contentions" in Case 1:22-cv-01248-CJB (in the U.S. District Court for the District of Delaware).
Document STI-1248-001806, filed with Document filed Jun. 30, 2023, "Specified Technologies Inc.'s Invalidity Contentions" in Case 1:22-cv-01248-CJB (in the U.S. District Court for the District of Delaware).
Document STI-1248-003725, filed with Document filed Jun. 30, 2023, "Specified Technologies Inc.'s Invalidity Contentions" in Case 1:22-cv-01248-CJB (in the U.S. District Court for the District of Delaware).
Document STI-1248-003736, filed with Document filed Jun. 30, 2023, "Specified Technologies Inc.'s Invalidity Contentions" in Case 1:22-cv-01248-CJB (in the U.S. District Court for the District of Delaware).
Document STI-1248-003737, filed with Document filed Jun. 30, 2023, "Specified Technologies Inc.'s Invalidity Contentions" in Case 1:22-cv-01248-CJB (in the U.S. District Court for the District of Delaware).
Document STI-1248-003738, filed with Document filed Jun. 30, 2023, "Specified Technologies Inc.'s Invalidity Contentions" in Case 1:22-cv-01248-CJB (in the U.S. District Court for the District of Delaware).
Document STI-1248-003739, filed with Document filed Jun. 30, 2023, "Specified Technologies Inc.'s Invalidity Contentions" in Case 1:22-cv-01248-CJB (in the U.S. District Court for the District of Delaware).
Document STI-1248-003766, filed with Document filed Jun. 30, 2023, "Specified Technologies Inc.'s Invalidity Contentions" in Case 1:22-cv-01248-CJB (in the U.S. District Court for the District of Delaware).
Document STI-1248-003767, filed with Document filed Jun. 30, 2023, "Specified Technologies Inc.'s Invalidity Contentions" in Case 1:22-cv-01248-CJB (in the U.S. District Court for the District of Delaware).
Document STI-1248-003768, filed with Document filed Jun. 30, 2023, "Specified Technologies Inc.'s Invalidity Contentions" in Case 1:22-cv-01248-CJB (in the U.S. District Court for the District of Delaware).
Document STI-1248-003769, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-003770, filed with Document filed Jun. 30, 2023, "Specified Technologies Inc.'s Invalidity Contentions" in Case 1:22-cv-01248-CJB (in the U.S. District Court for the District of Delaware).
Document STI-1248-003771, filed with Document filed Jun. 30, 2023, "Specified Technologies Inc.'s Invalidity Contentions" in Case 1:22-cv-01248-CJB (in the U.S. District Court for the District of Delaware).
Document STI-1248-003772, filed with Document filed Jun. 30, 2023, "Specified Technologies Inc.'s Invalidity Contentions" in Case 1:22-cv-01248-CJB (in the U.S. District Court for the District of Delaware).
Document STI-1248-003773, filed with Document filed Jun. 30, 2023, "Specified Technologies Inc.'s Invalidity Contentions" in Case 1:22-cv-01248-CJB (in the U.S. District Court for the District of Delaware).
Document STI-1248-003774, filed with Document filed Jun. 30, 2023, "Specified Technologies Inc.'s Invalidity Contentions" in Case 1:22-cv-01248-CJB (in the U.S. District Court for the District of Delaware).
Document STI-1248-003775, filed with Document filed Jun. 30, 2023, "Specified Technologies Inc.'s Invalidity Contentions" in Case 1:22-cv-01248-CJB (in the U.S. District Court for the District of Delaware).
Document STI-1248-003776, filed with Document filed Jun. 30, 2023, "Specified Technologies Inc.'s Invalidity Contentions" in Case 1:22-cv-01248-CJB (in the U.S. District Court for the District of Delaware).
Document STI-1248-003777, filed with Document filed Jun. 30, 2023, "Specified Technologies Inc.'s Invalidity Contentions" in Case 1:22-cv-01248-CJB (in the U.S. District Court for the District of Delaware).
Document STI-1248-003778, filed with Document filed Jun. 30, 2023, "Specified Technologies Inc.'s Invalidity Contentions" in Case 1:22-cv-01248-CJB (in the U.S. District Court for the District of Delaware).
Document STI-1248-003779, filed with Document filed Jun. 30, 2023, "Specified Technologies Inc.'s Invalidity Contentions" in Case 1:22-cv-01248-CJB (in the U.S. District Court for the District of Delaware).
Document STI-1248-003780, filed with Document filed Jun. 30, 2023, "Specified Technologies Inc.'s Invalidity Contentions" in Case 1:22-cv-01248-CJB (in the U.S. District Court for the District of Delaware).
Document STI-1248-003781, filed with Document filed Jun. 30, 2023, "Specified Technologies Inc.'s Invalidity Contentions" in Case 1:22-cv-01248-CJB (in the U.S. District Court for the District of Delaware).
Document STI-1248-003782, filed with Document filed Jun. 30, 2023, "Specified Technologies Inc.'s Invalidity Contentions" in Case 1:22-cv-01248-CJB (in the U.S. District Court for the District of Delaware).
Document STI-1248-003783, filed with Document filed Jun. 30, 2023, "Specified Technologies Inc.'s Invalidity Contentions" in Case 1:22-cv-01248-CJB (in the U.S. District Court for the District of Delaware).
Document STI-1248-003787, filed with Document filed Jun. 30, 2023, "Specified Technologies Inc.'s Invalidity Contentions" in Case 1:22-cv-01248-CJB (in the U.S. District Court for the District of Delaware).
Document STI-1248-003791, filed with Document filed Jun. 30, 2023, "Specified Technologies Inc.'s Invalidity Contentions" in Case 1:22-cv-01248-CJB (in the U.S. District Court for the District of Delaware).
Document STI-1248-003792, filed with Document filed Jun. 30, 2023, "Specified Technologies Inc.'s Invalidity Contentions" in Case 1:22-cv-01248-CJB (in the U.S. District Court for the District of Delaware).
Document STI-1248-003806, filed with Document filed Jun. 30, 2023, "Specified Technologies Inc.'s Invalidity Contentions" in Case 1:22-cv-01248-CJB (in the U.S. District Court for the District of Delaware).
Document STI-1248-003808, filed with Document filed Jun. 30, 2023, "Specified Technologies Inc.'s Invalidity Contentions" in Case 1:22-cv-01248-CJB (in the U.S. District Court for the District of Delaware).
Document STI-1248-003812, filed with Document filed Jun. 30, 2023, "Specified Technologies Inc.'s Invalidity Contentions" in Case 1:22-cv-01248-CJB (in the U.S. District Court for the District of Delaware).
Document STI-1248-003816, filed with Document filed Jun. 30, 2023, "Specified Technologies Inc.'s Invalidity Contentions" in Case 1:22-cv-01248-CJB (in the U.S. District Court for the District of Delaware).
Document STI-1248-003820, filed with Document filed Jun. 30, 2023, "Specified Technologies Inc.'s Invalidity Contentions" in Case 1:22-cv-01248-CJB (in the U.S. District Court for the District of Delaware).
Document STI-1248-003824, filed with Document filed Jun. 30, 2023, "Specified Technologies Inc.'s Invalidity Contentions" in Case 1:22-cv-01248-CJB (in the U.S. District Court for the District of Delaware).
Document STI-1248-003827, filed with Document filed Jun. 30, 2023, "Specified Technologies Inc.'s Invalidity Contentions" in Case 1:22-cv-01248-CJB (in the U.S. District Court for the District of Delaware).
Document STI-1248-003828, filed with Document filed Jun. 30, 2023, "Specified Technologies Inc.'s Invalidity Contentions" in Case 1:22-cv-01248-CJB (in the U.S. District Court for the District of Delaware).
Document STI-1248-003829, filed with Document filed Jun. 30, 2023, "Specified Technologies Inc.'s Invalidity Contentions" in Case 1:22-cv-01248-CJB (in the U.S. District Court for the District of Delaware).
Document STI-1248-003830, filed with Document filed Jun. 30, 2023, "Specified Technologies Inc.'s Invalidity Contentions" in Case 1:22-cv-01248-CJB (in the U.S. District Court for the District of Delaware).
Document STI-1248-003837, filed with Document filed Jun. 30, 2023, "Specified Technologies Inc.'s Invalidity Contentions" in Case 1:22-cv-01248-CJB (in the U.S. District Court for the District of Delaware).
Document STI-1248-003838, filed with Document filed Jun. 30, 2023, "Specified Technologies Inc.'s Invalidity Contentions" in Case 1:22-cv-01248-CJB (in the U.S. District Court for the District of Delaware).
Document STI-1248-003839, filed with Document filed Jun. 30, 2023, "Specified Technologies Inc.'s Invalidity Contentions" in Case 1:22-cv-01248-CJB (in the U.S. District Court for the District of Delaware).
Document STI-1248-003840, filed with Document filed Jun. 30, 2023, "Specified Technologies Inc.'s Invalidity Contentions" in Case 1:22-cv-01248-CJB (in the U.S. District Court for the District of Delaware).
Document STI-1248-003841, filed with Document filed Jun. 30, 2023, "Specified Technologies Inc.'s Invalidity Contentions" in Case 1:22-cv-01248-CJB (in the U.S. District Court for the District of Delaware).
Document STI-1248-003842, filed with Document filed Jun. 30, 2023, "Specified Technologies Inc.'s Invalidity Contentions" in Case 1:22-cv-01248-CJB (in the U.S. District Court for the District of Delaware).
Document STI-1248-003843, filed with Document filed Jun. 30, 2023, "Specified Technologies Inc.'s Invalidity Contentions" in Case 1:22-cv-01248-CJB (in the U.S. District Court for the District of Delaware).
Document STI-1248-003844, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-003845, filed with Document filed Jun. 30, 2023, "Specified Technologies Inc.'s Invalidity Contentions" in Case 1:22-cv-01248-CJB (in the U.S. District Court for the District of Delaware).
Document STI-1248-003847, filed with Document filed Jun. 30, 2023, "Specified Technologies Inc.'s Invalidity Contentions" in Case 1:22-cv-01248-CJB (in the U.S. District Court for the District of Delaware).
Document STI-1248-003848, filed with Document filed Jun. 30, 2023, "Specified Technologies Inc.'s Invalidity Contentions" in Case 1:22-cv-01248-CJB (in the U.S. District Court for the District of Delaware).
Document STI-1248-003849, filed with Document filed Jun. 30, 2023, "Specified Technologies Inc.'s Invalidity Contentions" in Case 1:22-cv-01248-CJB (in the U.S. District Court for the District of Delaware).
Document STI-1248-003850, filed with Document filed Jun. 30, 2023, "Specified Technologies Inc.'s Invalidity Contentions" in Case 1:22-cv-01248-CJB (in the U.S. District Court for the District of Delaware).
Document STI-1248-003851, filed with Document filed Jun. 30, 2023, "Specified Technologies Inc.'s Invalidity Contentions" in Case 1:22-cv-01248-CJB (in the U.S. District Court for the District of Delaware).
Document STI-1248-003855, filed with Document filed Jun. 30, 2023, "Specified Technologies Inc.'s Invalidity Contentions" in Case 1:22-cv-01248-CJB (in the U.S. District Court for the District of Delaware).
Document STI-1248-003856, filed with Document filed Jun. 30, 2023, "Specified Technologies Inc.'s Invalidity Contentions" in Case 1:22-cv-01248-CJB (in the U.S. District Court for the District of Delaware).
Document STI-1248-003857, filed with Document filed Jun. 30, 2023, "Specified Technologies Inc.'s Invalidity Contentions" in Case 1:22-cv-01248-CJB (in the U.S. District Court for the District of Delaware).
Document STI-1248-003859, filed with Document filed Jun. 30, 2023, "Specified Technologies Inc.'s Invalidity Contentions" in Case 1:22-cv-01248-CJB (in the U.S. District Court for the District of Delaware).
Document STI-1248-003892, filed with Document filed Jun. 30, 2023, "Specified Technologies Inc.'s Invalidity Contentions" in Case 1:22-cv-01248-CJB (in the U.S. District Court for the District of Delaware).
Document STI-1248-003903, filed with Document filed Jun. 30, 2023, "Specified Technologies Inc.'s Invalidity Contentions" in Case 1:22-cv-01248-CJB (in the U.S. District Court for the District of Delaware).
Document STI-1248-004139, filed with Document filed Jun. 30, 2023, "Specified Technologies Inc.'s Invalidity Contentions" in Case 1:22-cv-01248-CJB (in the U.S. District Court for the District of Delaware).
Document STI-1248-004140, filed with Document filed Jun. 30, 2023, "Specified Technologies Inc.'s Invalidity Contentions" in Case 1:22-cv-01248-CJB (in the U.S. District Court for the District of Delaware).
Document STI-1248-004141, filed with Document filed Jun. 30, 2023, "Specified Technologies Inc.'s Invalidity Contentions" in Case 1:22-cv-01248-CJB (in the U.S. District Court for the District of Delaware).
Document STI-1248-004146, filed with Document filed Jun. 30, 2023, "Specified Technologies Inc.'s Invalidity Contentions" in Case 1:22-cv-01248-CJB (in the U.S. District Court for the District of Delaware).
Document STI-1248-004160, filed with Document filed Jun. 30, 2023, "Specified Technologies Inc.'s Invalidity Contentions" in Case 1:22-cv-01248-CJB (in the U.S. District Court for the District of Delaware).
Document STI-1248-005457, filed with Document filed Jun. 30, 2023, "Specified Technologies Inc.'s Invalidity Contentions" in Case 1:22-cv-01248-CJB (in the U.S. District Court for the District of Delaware).
Document STI-1248-005458, filed with Document filed Jun. 30, 2023, "Specified Technologies Inc.'s Invalidity Contentions" in Case 1:22-cv-01248-CJB (in the U.S. District Court for the District of Delaware).
Document STI-1248-005459, filed with Document filed Jun. 30, 2023, "Specified Technologies Inc.'s Invalidity Contentions" in Case 1:22-cv-01248-CJB (in the U.S. District Court for the District of Delaware).
Document STI-1248-005460, filed with Document filed Jun. 30, 2023, "Specified Technologies Inc.'s Invalidity Contentions" in Case 1:22-cv-01248-CJB (in the U.S. District Court for the District of Delaware).
Document STI-1248-005461, filed with Document filed Jun. 30, 2023, "Specified Technologies Inc.'s Invalidity Contentions" in Case 1:22-cv-01248-CJB (in the U.S. District Court for the District of Delaware).
Document STI-1248-005462, filed with Document filed Jun. 30, 2023, "Specified Technologies Inc.'s Invalidity Contentions" in Case 1:22-cv-01248-CJB (in the U.S. District Court for the District of Delaware).
Document STI-1248-005463, filed with Document filed Jun. 30, 2023, "Specified Technologies Inc.'s Invalidity Contentions" in Case 1:22-cv-01248-CJB (in the U.S. District Court for the District of Delaware).
Document STI-1248-005485, filed with Document filed Jun. 30, 2023, "Specified Technologies Inc.'s Invalidity Contentions" in Case 1:22-cv-01248-CJB (in the U.S. District Court for the District of Delaware).
Document STI-1248-005487, filed with Document filed Jun. 30, 2023, "Specified Technologies Inc.'s Invalidity Contentions" in Case 1:22-cv-01248-CJB (in the U.S. District Court for the District of Delaware).
Document STI-1248-005488, filed with Document filed Jun. 30, 2023, "Specified Technologies Inc.'s Invalidity Contentions" in Case 1:22-cv-01248-CJB (in the U.S. District Court for the District of Delaware).
Document STI-1248-005489, filed with Document filed Jun. 30, 2023, "Specified Technologies Inc.'s Invalidity Contentions" in Case 1:22-cv-01248-CJB (in the U.S. District Court for the District of Delaware).
Document STI-1248-005491, filed with Document filed Jun. 30, 2023, "Specified Technologies Inc.'s Invalidity Contentions" in Case 1:22-cv-01248-CJB (in the U.S. District Court for the District of Delaware).
Document STI-1248-005492, filed with Document filed Jun. 30, 2023, "Specified Technologies Inc.'s Invalidity Contentions" in Case 1:22-cv-01248-CJB (in the U.S. District Court for the District of Delaware).
Document STI-1248-005493, filed with Document filed Jun. 30, 2023, "Specified Technologies Inc.'s Invalidity Contentions" in Case 1:22-cv-01248-CJB (in the U.S. District Court for the District of Delaware).
Document STI-1248-005494, filed with Document filed Jun. 30, 2023, "Specified Technologies Inc.'s Invalidity Contentions" in Case 1:22-cv-01248-CJB (in the U.S. District Court for the District of Delaware).
Document STI-1248-005523, filed with Document filed Jun. 30, 2023, "Specified Technologies Inc.'s Invalidity Contentions" in Case 1:22-cv-01248-CJB (in the U.S. District Court for the District of Delaware).
Document STI-1248-005524, filed with Document filed Jun. 30, 2023, "Specified Technologies Inc.'s Invalidity Contentions" in Case 1:22-cv-01248-CJB (in the U.S. District Court for the District of Delaware).
Document STI-1248-005525, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-005526, filed with Document filed Jun. 30, 2023, "Specified Technologies Inc.'s Invalidity Contentions" in Case 1:22-cv-01248-CJB (in the U.S. District Court for the District of Delaware).
Document STI-1248-005527, filed with Document filed Jun. 30, 2023, "Specified Technologies Inc.'s Invalidity Contentions" in Case 1:22-cv-01248-CJB (in the U.S. District Court for the District of Delaware).
Document STI-1248-005528, filed with Document filed Jun. 30, 2023, "Specified Technologies Inc.'s Invalidity Contentions" in Case 1:22-cv-01248-CJB (in the U.S. District Court for the District of Delaware).
Document STI-1248-000050, filed with Document filed Jun. 30, 2023, "Specified Technologies Inc.'s Invalidity Contentions" in Case 1:22-cv-01248-CJB (in the U.S. District Court for the District of Delaware).
Document STI-1248-000072, filed with Document filed Jun. 30, 2023, "Specified Technologies Inc.'s Invalidity Contentions" in Case 1:22-cv-01248-CJB (in the U.S. District Court for the District of Delaware).
Document STI-1248-000853, filed with Document filed Jun. 30, 2023, "Specified Technologies Inc.'s Invalidity Contentions" in Case 1:22-cv-01248-CJB (in the U.S. District Court for the District of Delaware).
Document STI-1248-000854, filed with Document filed Jun. 30, 2023, "Specified Technologies Inc.'s Invalidity Contentions" in Case 1:22-cv-01248-CJB (in the U.S. District Court for the District of Delaware).
Document STI-1248-000855, filed with Document filed Jun. 30, 2023, "Specified Technologies Inc.'s Invalidity Contentions" in Case 1:22-cv-01248-CJB (in the U.S. District Court for the District of Delaware).
Document STI-1248-000863, filed with Document filed Jun. 30, 2023, "Specified Technologies Inc.'s Invalidity Contentions" in Case 1:22-cv-01248-CJB (in the U.S. District Court for the District of Delaware).
Document STI-1248-000937, filed with Document filed Jun. 30, 2023, "Specified Technologies Inc.'s Invalidity Contentions" in Case 1:22-cv-01248-CJB (in the U.S. District Court for the District of Delaware).
Document STI-1248-000973, filed with Document filed Jun. 30, 2023, "Specified Technologies Inc.'s Invalidity Contentions" in Case 1:22-cv-01248-CJB (in the U.S. District Court for the District of Delaware).
Document STI-1248-000976, filed with Document filed Jun. 30, 2023, "Specified Technologies Inc.'s Invalidity Contentions" in Case 1:22-cv-01248-CJB (in the U.S. District Court for the District of Delaware).
Document STI-1248-001000, filed with Document filed Jun. 30, 2023, "Specified Technologies Inc.'s Invalidity Contentions" in Case 1:22-cv-01248-CJB (in the U.S. District Court for the District of Delaware).
Document STI-1248-001001, filed with Document filed Jun. 30, 2023, "Specified Technologies Inc.'s Invalidity Contentions" in Case 1:22-cv-01248-CJB (in the U.S. District Court for the District of Delaware).
Document STI-1248-001070, filed with Document filed Jun. 30, 2023, "Specified Technologies Inc.'s Invalidity Contentions" in Case 1:22-cv-01248-CJB (in the U.S. District Court for the District of Delaware).
Document STI-1248-001084, filed with Document filed Jun. 30, 2023, "Specified Technologies Inc.'s Invalidity Contentions" in Case 1:22-cv-01248-CJB (in the U.S. District Court for the District of Delaware).
Document STI-1248-001086, filed with Document filed Jun. 30, 2023, "Specified Technologies Inc.'s Invalidity Contentions" in Case 1:22-cv-01248-CJB (in the U.S. District Court for the District of Delaware).
Document STI-1248-001107, filed with Document filed Jun. 30, 2023, "Specified Technologies Inc.'s Invalidity Contentions" in Case 1:22-cv-01248-CJB (in the U.S. District Court for the District of Delaware).
Document STI-1248-001670, filed with Document filed Jun. 30, 2023, "Specified Technologies Inc.'s Invalidity Contentions" in Case 1:22-cv-01248-CJB (in the U.S. District Court for the District of Delaware).
Document STI-1248-001671, filed with Document filed Jun. 30, 2023, "Specified Technologies Inc.'s Invalidity Contentions" in Case 1:22-cv-01248-CJB (in the U.S. District Court for the District of Delaware).
Document STI-1248-001672, filed with Document filed Jun. 30, 2023, "Specified Technologies Inc.'s Invalidity Contentions" in Case 1:22-cv-01248-CJB (in the U.S. District Court for the District of Delaware).
Document STI-1248-001673, filed with Document filed Jun. 30, 2023, "Specified Technologies Inc.'s Invalidity Contentions" in Case 1:22-cv-01248-CJB (in the U.S. District Court for the District of Delaware).
Document STI-1248-001674, filed with Document filed Jun. 30, 2023, "Specified Technologies Inc.'s Invalidity Contentions" in Case 1:22-cv-01248-CJB (in the U.S. District Court for the District of Delaware).
Document STI-1248-001675, filed with Document filed Jun. 30, 2023, "Specified Technologies Inc.'s Invalidity Contentions" in Case 1:22-cv-01248-CJB (in the U.S. District Court for the District of Delaware).
Document STI-1248-001676, filed with Document filed Jun. 30, 2023, "Specified Technologies Inc.'s Invalidity Contentions" in Case 1:22-cv-01248-CJB (in the U.S. District Court for the District of Delaware).
Document STI-1248-001677, filed with Document filed Jun. 30, 2023, "Specified Technologies Inc.'s Invalidity Contentions" in Case 1:22-cv-01248-CJB (in the U.S. District Court for the District of Delaware).
Document STI-1248-001678, filed with Document filed Jun. 30, 2023, "Specified Technologies Inc.'s Invalidity Contentions" in Case 1:22-cv-01248-CJB (in the U.S. District Court for the District of Delaware).
Document STI-1248-001679, filed with Document filed Jun. 30, 2023, "Specified Technologies Inc.'s Invalidity Contentions" in Case 1:22-cv-01248-CJB (in the U.S. District Court for the District of Delaware).
Document STI-1248-001680, filed with Document filed Jun. 30, 2023, "Specified Technologies Inc.'s Invalidity Contentions" in Case 1:22-cv-01248-CJB (in the U.S. District Court for the District of Delaware).
Document STI-1248-001681, filed with Document filed Jun. 30, 2023, "Specified Technologies Inc.'s Invalidity Contentions" in Case 1:22-cv-01248-CJB (in the U.S. District Court for the District of Delaware).
Document STI-1248-001682, filed with Document filed Jun. 30, 2023, "Specified Technologies Inc.'s Invalidity Contentions" in Case 1:22-cv-01248-CJB (in the U.S. District Court for the District of Delaware).
Document STI-1248-001683, filed with Document filed Jun. 30, 2023, "Specified Technologies Inc.'s Invalidity Contentions" in Case 1:22-cv-01248-CJB (in the U.S. District Court for the District of Delaware).
Document STI-1248-001684, filed with Document filed Jun. 30, 2023, "Specified Technologies Inc.'s Invalidity Contentions" in Case 1:22-cv-01248-CJB (in the U.S. District Court for the District of Delaware).
Document STI-1248-001685, filed with Document filed Jun. 30, 2023, "Specified Technologies Inc.'s Invalidity Contentions" in Case 1:22-cv-01248-CJB (in the U.S. District Court for the District of Delaware).
Document STI-1248-001686, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-001687, filed with Document filed Jun. 30, 2023, "Specified Technologies Inc.'s Invalidity Contentions" in Case 1:22-cv-01248-CJB (in the U.S. District Court for the District of Delaware).
Document STI-1248-001688, filed with Document filed Jun. 30, 2023, "Specified Technologies Inc.'s Invalidity Contentions" in Case 1:22-cv-01248-CJB (in the U.S. District Court for the District of Delaware).
Document STI-1248-001689, filed with Document filed Jun. 30, 2023, "Specified Technologies Inc.'s Invalidity Contentions" in Case 1:22-cv-01248-CJB (in the U.S. District Court for the District of Delaware).
Document STI-1248-001690, filed with Document filed Jun. 30, 2023, "Specified Technologies Inc.'s Invalidity Contentions" in Case 1:22-cv-01248-CJB (in the U.S. District Court for the District of Delaware).
Document STI-1248-001691, filed with Document filed Jun. 30, 2023, "Specified Technologies Inc.'s Invalidity Contentions" in Case 1:22-cv-01248-CJB (in the U.S. District Court for the District of Delaware).
Document STI-1248-001692, filed with Document filed Jun. 30, 2023, "Specified Technologies Inc.'s Invalidity Contentions" in Case 1:22-cv-01248-CJB (in the U.S. District Court for the District of Delaware).
Document STI-1248-001693, filed with Document filed Jun. 30, 2023, "Specified Technologies Inc.'s Invalidity Contentions" in Case 1:22-cv-01248-CJB (in the U.S. District Court for the District of Delaware).
Document STI-1248-001694, filed with Document filed Jun. 30, 2023, "Specified Technologies Inc.'s Invalidity Contentions" in Case 1:22-cv-01248-CJB (in the U.S. District Court for the District of Delaware).
Document STI-1248-001695, filed with Document filed Jun. 30, 2023, "Specified Technologies Inc.'s Invalidity Contentions" in Case 1:22-cv-01248-CJB (in the U.S. District Court for the District of Delaware).
Document STI-1248-001696, filed with Document filed Jun. 30, 2023, "Specified Technologies Inc.'s Invalidity Contentions" in Case 1:22-cv-01248-CJB (in the U.S. District Court for the District of Delaware).
Document STI-1248-001697, filed with Document filed Jun. 30, 2023, "Specified Technologies Inc.'s Invalidity Contentions" in Case 1:22-cv-01248-CJB (in the U.S. District Court for the District of Delaware).
Document STI-1248-001698, filed with Document filed Jun. 30, 2023, "Specified Technologies Inc.'s Invalidity Contentions" in Case 1:22-cv-01248-CJB (in the U.S. District Court for the District of Delaware).
Document STI-1248-001699, filed with Document filed Jun. 30, 2023, "Specified Technologies Inc.'s Invalidity Contentions" in Case 1:22-cv-01248-CJB (in the U.S. District Court for the District of Delaware).
Document STI-1248-001700, filed with Document filed Jun. 30, 2023, "Specified Technologies Inc.'s Invalidity Contentions" in Case 1:22-cv-01248-CJB (in the U.S. District Court for the District of Delaware).
Document STI-1248-001706, filed with Document filed Jun. 30, 2023, "Specified Technologies Inc.'s Invalidity Contentions" in Case 1:22-cv-01248-CJB (in the U.S. District Court for the District of Delaware).
Document STI-1248-001707, filed with Document filed Jun. 30, 2023, "Specified Technologies Inc.'s Invalidity Contentions" in Case 1:22-cv-01248-CJB (in the U.S. District Court for the District of Delaware).
Document STI-1248-001708, filed with Document filed Jun. 30, 2023, "Specified Technologies Inc.'s Invalidity Contentions" in Case 1:22-cv-01248-CJB (in the U.S. District Court for the District of Delaware).
Document STI-1248-001709, filed with Document filed Jun. 30, 2023, "Specified Technologies Inc.'s Invalidity Contentions" in Case 1:22-cv-01248-CJB (in the U.S. District Court for the District of Delaware).
Document STI-1248-001710, filed with Document filed Jun. 30, 2023, "Specified Technologies Inc.'s Invalidity Contentions" in Case 1:22-cv-01248-CJB (in the U.S. District Court for the District of Delaware).
Document STI-1248-001711, filed with Document filed Jun. 30, 2023, "Specified Technologies Inc.'s Invalidity Contentions" in Case 1:22-cv-01248-CJB (in the U.S. District Court for the District of Delaware).
Document STI-1248-001712, filed with Document filed Jun. 30, 2023, "Specified Technologies Inc.'s Invalidity Contentions" in Case 1:22-cv-01248-CJB (in the U.S. District Court for the District of Delaware).
Document STI-1248-001713, filed with Document filed Jun. 30, 2023, "Specified Technologies Inc.'s Invalidity Contentions" in Case 1:22-cv-01248-CJB (in the U.S. District Court for the District of Delaware).
Document STI-1248-001714, filed with Document filed Jun. 30, 2023, "Specified Technologies Inc.'s Invalidity Contentions" in Case 1:22-cv-01248-CJB (in the U.S. District Court for the District of Delaware).
Document STI-1248-001715, filed with Document filed Jun. 30, 2023, "Specified Technologies Inc.'s Invalidity Contentions" in Case 1:22-cv-01248-CJB (in the U.S. District Court for the District of Delaware).
Document STI-1248-001716, filed with Document filed Jun. 30, 2023, "Specified Technologies Inc.'s Invalidity Contentions" in Case 1:22-cv-01248-CJB (in the U.S. District Court for the District of Delaware).
Document STI-1248-001717, filed with Document filed Jun. 30, 2023, "Specified Technologies Inc.'s Invalidity Contentions" in Case 1:22-cv-01248-CJB (in the U.S. District Court for the District of Delaware).
Document STI-1248-001718, filed with Document filed Jun. 30, 2023, "Specified Technologies Inc.'s Invalidity Contentions" in Case 1:22-cv-01248-CJB (in the U.S. District Court for the District of Delaware).
Document STI-1248-001719, filed with Document filed Jun. 30, 2023, "Specified Technologies Inc.'s Invalidity Contentions" in Case 1:22-cv-01248-CJB (in the U.S. District Court for the District of Delaware).
Document STI-1248-001720, filed with Document filed Jun. 30, 2023, "Specified Technologies Inc.'s Invalidity Contentions" in Case 1:22-cv-01248-CJB (in the U.S. District Court for the District of Delaware).
Document STI-1248-001722, filed with Document filed Jun. 30, 2023, "Specified Technologies Inc.'s Invalidity Contentions" in Case 1:22-cv-01248-CJB (in the U.S. District Court for the District of Delaware).
Document STI-1248-001723, filed with Document filed Jun. 30, 2023, "Specified Technologies Inc.'s Invalidity Contentions" in Case 1:22-cv-01248-CJB (in the U.S. District Court for the District of Delaware).
Document STI-1248-001724, filed with Document filed Jun. 30, 2023, "Specified Technologies Inc.'s Invalidity Contentions" in Case 1:22-cv-01248-CJB (in the U.S. District Court for the District of Delaware).
Document STI-1248-001725, filed with Document filed Jun. 30, 2023, "Specified Technologies Inc.'s Invalidity Contentions" in Case 1:22-cv-01248-CJB (in the U.S. District Court for the District of Delaware).
Document STI-1248-001726, filed with Document filed Jun. 30, 2023, "Specified Technologies Inc.'s Invalidity Contentions" in Case 1:22-cv-01248-CJB (in the U.S. District Court for the District of Delaware).
Document STI-1248-001727, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-001728, filed with Document filed Jun. 30, 2023, "Specified Technologies Inc.'s Invalidity Contentions" in Case 1:22-cv-01248-CJB (in the U.S. District Court for the District of Delaware).
Document STI-1248-001729, filed with Document filed Jun. 30, 2023, "Specified Technologies Inc.'s Invalidity Contentions" in Case 1:22-cv-01248-CJB (in the U.S. District Court for the District of Delaware).
Document STI-1248-001730, filed with Document filed Jun. 30, 2023, "Specified Technologies Inc.'s Invalidity Contentions" in Case 1:22-cv-01248-CJB (in the U.S. District Court for the District of Delaware).
Document STI-1248-001731, filed with Document filed Jun. 30, 2023, "Specified Technologies Inc.'s Invalidity Contentions" in Case 1:22-cv-01248-CJB (in the U.S. District Court for the District of Delaware).
Document STI-1248-001732, filed with Document filed Jun. 30, 2023, "Specified Technologies Inc.'s Invalidity Contentions" in Case 1:22-cv-01248-CJB (in the U.S. District Court for the District of Delaware).
Document STI-1248-001733, filed with Document filed Jun. 30, 2023, "Specified Technologies Inc.'s Invalidity Contentions" in Case 1:22-cv-01248-CJB (in the U.S. District Court for the District of Delaware).
Document STI-1248-001734, filed with Document filed Jun. 30, 2023, "Specified Technologies Inc.'s Invalidity Contentions" in Case 1:22-cv-01248-CJB (in the U.S. District Court for the District of Delaware).
Document STI-1248-001735, filed with Document filed Jun. 30, 2023, "Specified Technologies Inc.'s Invalidity Contentions" in Case 1:22-cv-01248-CJB (in the U.S. District Court for the District of Delaware).
Document STI-1248-001736, filed with Document filed Jun. 30, 2023, "Specified Technologies Inc.'s Invalidity Contentions" in Case 1:22-cv-01248-CJB (in the U.S. District Court for the District of Delaware).
Document STI-1248-001737, filed with Document filed Jun. 30, 2023, "Specified Technologies Inc.'s Invalidity Contentions" in Case 1:22-cv-01248-CJB (in the U.S. District Court for the District of Delaware).
Document STI-1248-001738, filed with Document filed Jun. 30, 2023, "Specified Technologies Inc.'s Invalidity Contentions" in Case 1:22-cv-01248-CJB (in the U.S. District Court for the District of Delaware).
Document STI-1248-001739, filed with Document filed Jun. 30, 2023, "Specified Technologies Inc.'s Invalidity Contentions" in Case 1:22-cv-01248-CJB (in the U.S. District Court for the District of Delaware).
Document STI-1248-001740, filed with Document filed Jun. 30, 2023, "Specified Technologies Inc.'s Invalidity Contentions" in Case 1:22-cv-01248-CJB (in the U.S. District Court for the District of Delaware).
Document STI-1248-001741, filed with Document filed Jun. 30, 2023, "Specified Technologies Inc.'s Invalidity Contentions" in Case 1:22-cv-01248-CJB (in the U.S. District Court for the District of Delaware).
Document STI-1248-001742, filed with Document filed Jun. 30, 2023, "Specified Technologies Inc.'s Invalidity Contentions" in Case 1:22-cv-01248-CJB (in the U.S. District Court for the District of Delaware).
Document STI-1248-001743, filed with Document filed Jun. 30, 2023, "Specified Technologies Inc.'s Invalidity Contentions" in Case 1:22-cv-01248-CJB (in the U.S. District Court for the District of Delaware).
Document STI-1248-001744, filed with Document filed Jun. 30, 2023, "Specified Technologies Inc.'s Invalidity Contentions" in Case 1:22-cv-01248-CJB (in the U.S. District Court for the District of Delaware).
Document STI-1248-001745, filed with Document filed Jun. 30, 2023, "Specified Technologies Inc.'s Invalidity Contentions" in Case 1:22-cv-01248-CJB (in the U.S. District Court for the District of Delaware).
Document STI-1248-001746, filed with Document filed Jun. 30, 2023, "Specified Technologies Inc.'s Invalidity Contentions" in Case 1:22-cv-01248-CJB (in the U.S. District Court for the District of Delaware).
Document STI-1248-001747, filed with Document filed Jun. 30, 2023, "Specified Technologies Inc.'s Invalidity Contentions" in Case 1:22-cv-01248-CJB (in the U.S. District Court for the District of Delaware).
Document STI-1248-001748, filed with Document filed Jun. 30, 2023, "Specified Technologies Inc.'s Invalidity Contentions" in Case 1:22-cv-01248-CJB (in the U.S. District Court for the District of Delaware).
Document STI-1248-001749, filed with Document filed Jun. 30, 2023, "Specified Technologies Inc.'s Invalidity Contentions" in Case 1:22-cv-01248-CJB (in the U.S. District Court for the District of Delaware).
Document STI-1248-001750, filed with Document filed Jun. 30, 2023, "Specified Technologies Inc.'s Invalidity Contentions" in Case 1:22-cv-01248-CJB (in the U.S. District Court for the District of Delaware).
Document STI-1248-001751, filed with Document filed Jun. 30, 2023, "Specified Technologies Inc.'s Invalidity Contentions" in Case 1:22-cv-01248-CJB (in the U.S. District Court for the District of Delaware).
Document STI-1248-001752, filed with Document filed Jun. 30, 2023, "Specified Technologies Inc.'s Invalidity Contentions" in Case 1:22-cv-01248-CJB (in the U.S. District Court for the District of Delaware).
Document STI-1248-001753, filed with Document filed Jun. 30, 2023, "Specified Technologies Inc.'s Invalidity Contentions" in Case 1:22-cv-01248-CJB (in the U.S. District Court for the District of Delaware).
Document STI-1248-001754, filed with Document filed Jun. 30, 2023, "Specified Technologies Inc.'s Invalidity Contentions" in Case 1:22-cv-01248-CJB (in the U.S. District Court for the District of Delaware).
Document STI-1248-001755, filed with Document filed Jun. 30, 2023, "Specified Technologies Inc.'s Invalidity Contentions" in Case 1:22-cv-01248-CJB (in the U.S. District Court for the District of Delaware).
Document STI-1248-001756, filed with Document filed Jun. 30, 2023, "Specified Technologies Inc.'s Invalidity Contentions" in Case 1:22-cv-01248-CJB (in the U.S. District Court for the District of Delaware).
Document STI-1248-001757, filed with Document filed Jun. 30, 2023, "Specified Technologies Inc.'s Invalidity Contentions" in Case 1:22-cv-01248-CJB (in the U.S. District Court for the District of Delaware).
Document STI-1248-001758, filed with Document filed Jun. 30, 2023, "Specified Technologies Inc.'s Invalidity Contentions" in Case 1:22-cv-01248-CJB (in the U.S. District Court for the District of Delaware).
Document STI-1248-001759, filed with Document filed Jun. 30, 2023, "Specified Technologies Inc.'s Invalidity Contentions" in Case 1:22-cv-01248-CJB (in the U.S. District Court for the District of Delaware).
Document STI-1248-001760, filed with Document filed Jun. 30, 2023, "Specified Technologies Inc.'s Invalidity Contentions" in Case 1:22-cv-01248-CJB (in the U.S. District Court for the District of Delaware).
Document STI-1248-001761, filed with Document filed Jun. 30, 2023, "Specified Technologies Inc.'s Invalidity Contentions" in Case 1:22-cv-01248-CJB (in the U.S. District Court for the District of Delaware).
Document STI-1248-001762, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-001763, filed with Document filed Jun. 30, 2023, "Specified Technologies Inc.'s Invalidity Contentions" in Case 1:22-cv-01248-CJB (in the U.S. District Court for the District of Delaware).
Document STI-1248-001764, filed with Document filed Jun. 30, 2023, "Specified Technologies Inc.'s Invalidity Contentions" in Case 1:22-cv-01248-CJB (in the U.S. District Court for the District of Delaware).
Document STI-1248-001765, filed with Document filed Jun. 30, 2023, "Specified Technologies Inc.'s Invalidity Contentions" in Case 1:22-cv-01248-CJB (in the U.S. District Court for the District of Delaware).
Document STI-1248-001766, filed with Document filed Jun. 30, 2023, "Specified Technologies Inc.'s Invalidity Contentions" in Case 1:22-cv-01248-CJB (in the U.S. District Court for the District of Delaware).
Document STI-1248-001767, filed with Document filed Jun. 30, 2023, "Specified Technologies Inc.'s Invalidity Contentions" in Case 1:22-cv-01248-CJB (in the U.S. District Court for the District of Delaware).
Document STI-1248-001768, filed with Document filed Jun. 30, 2023, "Specified Technologies Inc.'s Invalidity Contentions" in Case 1:22-cv-01248-CJB (in the U.S. District Court for the District of Delaware).
Document STI-1248-001769, filed with Document filed Jun. 30, 2023, "Specified Technologies Inc.'s Invalidity Contentions" in Case 1:22-cv-01248-CJB (in the U.S. District Court for the District of Delaware).
Document STI-1248-001770, filed with Document filed Jun. 30, 2023, "Specified Technologies Inc.'s Invalidity Contentions" in Case 1:22-cv-01248-CJB (in the U.S. District Court for the District of Delaware).
Document STI-1248-001771, filed with Document filed Jun. 30, 2023, "Specified Technologies Inc.'s Invalidity Contentions" in Case 1:22-cv-01248-CJB (in the U.S. District Court for the District of Delaware).
Document STI-1248-001772, filed with Document filed Jun. 30, 2023, "Specified Technologies Inc.'s Invalidity Contentions" in Case 1:22-cv-01248-CJB (in the U.S. District Court for the District of Delaware).
Document STI-1248-001773, filed with Document filed Jun. 30, 2023, "Specified Technologies Inc.'s Invalidity Contentions" in Case 1:22-cv-01248-CJB (in the U.S. District Court for the District of Delaware).
Document STI-1248-001774, filed with Document filed Jun. 30, 2023, "Specified Technologies Inc.'s Invalidity Contentions" in Case 1:22-cv-01248-CJB (in the U.S. District Court for the District of Delaware).
Document STI-1248-001775, filed with Document filed Jun. 30, 2023, "Specified Technologies Inc.'s Invalidity Contentions" in Case 1:22-cv-01248-CJB (in the U.S. District Court for the District of Delaware).
Document STI-1248-001776, filed with Document filed Jun. 30, 2023, "Specified Technologies Inc.'s Invalidity Contentions" in Case 1:22-cv-01248-CJB (in the U.S. District Court for the District of Delaware).
Document STI-1248-001777, filed with Document filed Jun. 30, 2023, "Specified Technologies Inc.'s Invalidity Contentions" in Case 1:22-cv-01248-CJB (in the U.S. District Court for the District of Delaware).
Document STI-1248-001778, filed with Document filed Jun. 30, 2023, "Specified Technologies Inc.'s Invalidity Contentions" in Case 1:22-cv-01248-CJB (in the U.S. District Court for the District of Delaware).
Document STI-1248-001783, filed with Document filed Jun. 30, 2023, "Specified Technologies Inc.'s Invalidity Contentions" in Case 1:22-cv-01248-CJB (in the U.S. District Court for the District of Delaware).
Document STI-1248-001784, filed with Document filed Jun. 30, 2023, "Specified Technologies Inc.'s Invalidity Contentions" in Case 1:22-cv-01248-CJB (in the U.S. District Court for the District of Delaware).
Document STI-1248-001785, filed with Document filed Jun. 30, 2023, "Specified Technologies Inc.'s Invalidity Contentions" in Case 1:22-cv-01248-CJB (in the U.S. District Court for the District of Delaware).
Document STI-1248-001786, filed with Document filed Jun. 30, 2023, "Specified Technologies Inc.'s Invalidity Contentions" in Case 1:22-cv-01248-CJB (in the U.S. District Court for the District of Delaware).
Document STI-1248-001787, filed with Document filed Jun. 30, 2023, "Specified Technologies Inc.'s Invalidity Contentions" in Case 1:22-cv-01248-CJB (in the U.S. District Court for the District of Delaware).
Document STI-1248-001788, filed with Document filed Jun. 30, 2023, "Specified Technologies Inc.'s Invalidity Contentions" in Case 1:22-cv-01248-CJB (in the U.S. District Court for the District of Delaware).
Document STI-1248-001789, filed with Document filed Jun. 30, 2023, "Specified Technologies Inc.'s Invalidity Contentions" in Case 1:22-cv-01248-CJB (in the U.S. District Court for the District of Delaware).
Document STI-1248-001790, filed with Document filed Jun. 30, 2023, "Specified Technologies Inc.'s Invalidity Contentions" in Case 1:22-cv-01248-CJB (in the U.S. District Court for the District of Delaware).
Document STI-1248-001791, filed with Document filed Jun. 30, 2023, "Specified Technologies Inc.'s Invalidity Contentions" in Case 1:22-cv-01248-CJB (in the U.S. District Court for the District of Delaware).
Document STI-1248-001792, filed with Document filed Jun. 30, 2023, "Specified Technologies Inc.'s Invalidity Contentions" in Case 1:22-cv-01248-CJB (in the U.S. District Court for the District of Delaware).
Document STI-1248-001793, filed with Document filed Jun. 30, 2023, "Specified Technologies Inc.'s Invalidity Contentions" in Case 1:22-cv-01248-CJB (in the U.S. District Court for the District of Delaware).
Document STI-1248-001794, filed with Document filed Jun. 30, 2023, "Specified Technologies Inc.'s Invalidity Contentions" in Case 1:22-cv-01248-CJB (in the U.S. District Court for the District of Delaware).
Document STI-1248-001795, filed with Document filed Jun. 30, 2023, "Specified Technologies Inc.'s Invalidity Contentions" in Case 1:22-cv-01248-CJB (in the U.S. District Court for the District of Delaware).
Document STI-1248-001796, filed with Document filed Jun. 30, 2023, "Specified Technologies Inc.'s Invalidity Contentions" in Case 1:22-cv-01248-CJB (in the U.S. District Court for the District of Delaware).
Document STI-1248-001797, filed with Document filed Jun. 30, 2023, "Specified Technologies Inc.'s Invalidity Contentions" in Case 1:22-cv-01248-CJB (in the U.S. District Court for the District of Delaware).
Document STI-1248-001801, filed with Document filed Jun. 30, 2023, "Specified Technologies Inc.'s Invalidity Contentions" in Case 1:22-cv-01248-CJB (in the U.S. District Court for the District of Delaware).
Document STI-1248-001807, filed with Document filed Jun. 30, 2023, "Specified Technologies Inc.'s Invalidity Contentions" in Case 1:22-cv-01248-CJB (in the U.S. District Court for the District of Delaware).
Document STI-1248-001808, filed with Document filed Jun. 30, 2023, "Specified Technologies Inc.'s Invalidity Contentions" in Case 1:22-cv-01248-CJB (in the U.S. District Court for the District of Delaware).
Document STI-1248-001809, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-001810, filed with Document filed Jun. 30, 2023, "Specified Technologies Inc.'s Invalidity Contentions" in Case 1:22-cv-01248-CJB (in the U.S. District Court for the District of Delaware).
Document STI-1248-001811, filed with Document filed Jun. 30, 2023, "Specified Technologies Inc.'s Invalidity Contentions" in Case 1:22-cv-01248-CJB (in the U.S. District Court for the District of Delaware).
Document STI-1248-001812, filed with Document filed Jun. 30, 2023, "Specified Technologies Inc.'s Invalidity Contentions" in Case 1:22-cv-01248-CJB (in the U.S. District Court for the District of Delaware).
Document STI-1248-001813, filed with Document filed Jun. 30, 2023, "Specified Technologies Inc.'s Invalidity Contentions" in Case 1:22-cv-01248-CJB (in the U.S. District Court for the District of Delaware).
Document STI-1248-001814, filed with Document filed Jun. 30, 2023, "Specified Technologies Inc.'s Invalidity Contentions" in Case 1:22-cv-01248-CJB (in the U.S. District Court for the District of Delaware).
Document STI-1248-001815, filed with Document filed Jun. 30, 2023, "Specified Technologies Inc.'s Invalidity Contentions" in Case 1:22-cv-01248-CJB (in the U.S. District Court for the District of Delaware).
Document STI-1248-001816, filed with Document filed Jun. 30, 2023, "Specified Technologies Inc.'s Invalidity Contentions" in Case 1:22-cv-01248-CJB (in the U.S. District Court for the District of Delaware).
Document STI-1248-001817, filed with Document filed Jun. 30, 2023, "Specified Technologies Inc.'s Invalidity Contentions" in Case 1:22-cv-01248-CJB (in the U.S. District Court for the District of Delaware).
Document STI-1248-001818, filed with Document filed Jun. 30, 2023, "Specified Technologies Inc.'s Invalidity Contentions" in Case 1:22-cv-01248-CJB (in the U.S. District Court for the District of Delaware).
Document STI-1248-001819, filed with Document filed Jun. 30, 2023, "Specified Technologies Inc.'s Invalidity Contentions" in Case 1:22-cv-01248-CJB (in the U.S. District Court for the District of Delaware).
Document STI-1248-001820, filed with Document filed Jun. 30, 2023, "Specified Technologies Inc.'s Invalidity Contentions" in Case 1:22-cv-01248-CJB (in the U.S. District Court for the District of Delaware).
Document STI-1248-001821, filed with Document filed Jun. 30, 2023, "Specified Technologies Inc.'s Invalidity Contentions" in Case 1:22-cv-01248-CJB (in the U.S. District Court for the District of Delaware).
Document STI-1248-001822, filed with Document filed Jun. 30, 2023, "Specified Technologies Inc.'s Invalidity Contentions" in Case 1:22-cv-01248-CJB (in the U.S. District Court for the District of Delaware).
Document STI-1248-001823, filed with Document filed Jun. 30, 2023, "Specified Technologies Inc.'s Invalidity Contentions" in Case 1:22-cv-01248-CJB (in the U.S. District Court for the District of Delaware).
Document STI-1248-001825, filed with Document filed Jun. 30, 2023, "Specified Technologies Inc.'s Invalidity Contentions" in Case 1:22-cv-01248-CJB (in the U.S. District Court for the District of Delaware).
Document STI-1248-001826, filed with Document filed Jun. 30, 2023, "Specified Technologies Inc.'s Invalidity Contentions" in Case 1:22-cv-01248-CJB (in the U.S. District Court for the District of Delaware).
Document STI-1248-001827, filed with Document filed Jun. 30, 2023, "Specified Technologies Inc.'s Invalidity Contentions" in Case 1:22-cv-01248-CJB (in the U.S. District Court for the District of Delaware).
Document STI-1248-001828, filed with Document filed Jun. 30, 2023, "Specified Technologies Inc.'s Invalidity Contentions" in Case 1:22-cv-01248-CJB (in the U.S. District Court for the District of Delaware).
Document STI-1248-001829, filed with Document filed Jun. 30, 2023, "Specified Technologies Inc.'s Invalidity Contentions" in Case 1:22-cv-01248-CJB (in the U.S. District Court for the District of Delaware).
Document STI-1248-001830, filed with Document filed Jun. 30, 2023, "Specified Technologies Inc.'s Invalidity Contentions" in Case 1:22-cv-01248-CJB (in the U.S. District Court for the District of Delaware).
Document STI-1248-001831, filed with Document filed Jun. 30, 2023, "Specified Technologies Inc.'s Invalidity Contentions" in Case 1:22-cv-01248-CJB (in the U.S. District Court for the District of Delaware).
Document STI-1248-001832, filed with Document filed Jun. 30, 2023, "Specified Technologies Inc.'s Invalidity Contentions" in Case 1:22-cv-01248-CJB (in the U.S. District Court for the District of Delaware).
Document STI-1248-001833, filed with Document filed Jun. 30, 2023, "Specified Technologies Inc.'s Invalidity Contentions" in Case 1:22-cv-01248-CJB (in the U.S. District Court for the District of Delaware).
Document STI-1248-001834, filed with Document filed Jun. 30, 2023, "Specified Technologies Inc.'s Invalidity Contentions" in Case 1:22-cv-01248-CJB (in the U.S. District Court for the District of Delaware).
Document STI-1248-001835, filed with Document filed Jun. 30, 2023, "Specified Technologies Inc.'s Invalidity Contentions" in Case 1:22-cv-01248-CJB (in the U.S. District Court for the District of Delaware).
Document STI-1248-001836, filed with Document filed Jun. 30, 2023, "Specified Technologies Inc.'s Invalidity Contentions" in Case 1:22-cv-01248-CJB (in the U.S. District Court for the District of Delaware).
Document STI-1248-001837, filed with Document filed Jun. 30, 2023, "Specified Technologies Inc.'s Invalidity Contentions" in Case 1:22-cv-01248-CJB (in the U.S. District Court for the District of Delaware).
Document STI-1248-001838, filed with Document filed Jun. 30, 2023, "Specified Technologies Inc.'s Invalidity Contentions" in Case 1:22-cv-01248-CJB (in the U.S. District Court for the District of Delaware).
Document STI-1248-001839, filed with Document filed Jun. 30, 2023, "Specified Technologies Inc.'s Invalidity Contentions" in Case 1:22-cv-01248-CJB (in the U.S. District Court for the District of Delaware).
Document STI-1248-001840, filed with Document filed Jun. 30, 2023, "Specified Technologies Inc.'s Invalidity Contentions" in Case 1:22-cv-01248-CJB (in the U.S. District Court for the District of Delaware).
Document STI-1248-001841, filed with Document filed Jun. 30, 2023, "Specified Technologies Inc.'s Invalidity Contentions" in Case 1:22-cv-01248-CJB (in the U.S. District Court for the District of Delaware).
Document STI-1248-001842, filed with Document filed Jun. 30, 2023, "Specified Technologies Inc.'s Invalidity Contentions" in Case 1:22-cv-01248-CJB (in the U.S. District Court for the District of Delaware).
Document STI-1248-001843, filed with Document filed Jun. 30, 2023, "Specified Technologies Inc.'s Invalidity Contentions" in Case 1:22-cv-01248-CJB (in the U.S. District Court for the District of Delaware).
Document STI-1248-001844, filed with Document filed Jun. 30, 2023, "Specified Technologies Inc.'s Invalidity Contentions" in Case 1:22-cv-01248-CJB (in the U.S. District Court for the District of Delaware).
Document STI-1248-001845, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-001846, filed with Document filed Jun. 30, 2023, "Specified Technologies Inc.'s Invalidity Contentions" in Case 1:22-cv-01248-CJB (in the U.S. District Court for the District of Delaware).
Document STI-1248-001847, filed with Document filed Jun. 30, 2023, "Specified Technologies Inc.'s Invalidity Contentions" in Case 1:22-cv-01248-CJB (in the U.S. District Court for the District of Delaware).
Document STI-1248-001848, filed with Document filed Jun. 30, 2023, "Specified Technologies Inc.'s Invalidity Contentions" in Case 1:22-cv-01248-CJB (in the U.S. District Court for the District of Delaware).
Document STI-1248-001849, filed with Document filed Jun. 30, 2023, "Specified Technologies Inc.'s Invalidity Contentions" in Case 1:22-cv-01248-CJB (in the U.S. District Court for the District of Delaware).
Document STI-1248-001850, filed with Document filed Jun. 30, 2023, "Specified Technologies Inc.'s Invalidity Contentions" in Case 1:22-cv-01248-CJB (in the U.S. District Court for the District of Delaware).
Document STI-1248-001851, filed with Document filed Jun. 30, 2023, "Specified Technologies Inc.'s Invalidity Contentions" in Case 1:22-cv-01248-CJB (in the U.S. District Court for the District of Delaware).
Document STI-1248-001852, filed with Document filed Jun. 30, 2023, "Specified Technologies Inc.'s Invalidity Contentions" in Case 1:22-cv-01248-CJB (in the U.S. District Court for the District of Delaware).
Document STI-1248-001853, filed with Document filed Jun. 30, 2023, "Specified Technologies Inc.'s Invalidity Contentions" in Case 1:22-cv-01248-CJB (in the U.S. District Court for the District of Delaware).
Document STI-1248-001854, filed with Document filed Jun. 30, 2023, "Specified Technologies Inc.'s Invalidity Contentions" in Case 1:22-cv-01248-CJB (in the U.S. District Court for the District of Delaware).
Document STI-1248-001855, filed with Document filed Jun. 30, 2023, "Specified Technologies Inc.'s Invalidity Contentions" in Case 1:22-cv-01248-CJB (in the U.S. District Court for the District of Delaware).
Document STI-1248-001856, filed with Document filed Jun. 30, 2023, "Specified Technologies Inc.'s Invalidity Contentions" in Case 1:22-cv-01248-CJB (in the U.S. District Court for the District of Delaware).
Document STI-1248-001857, filed with Document filed Jun. 30, 2023, "Specified Technologies Inc.'s Invalidity Contentions" in Case 1:22-cv-01248-CJB (in the U.S. District Court for the District of Delaware).
Document STI-1248-001858, filed with Document filed Jun. 30, 2023, "Specified Technologies Inc.'s Invalidity Contentions" in Case 1:22-cv-01248-CJB (in the U.S. District Court for the District of Delaware).
Document STI-1248-001859, filed with Document filed Jun. 30, 2023, "Specified Technologies Inc.'s Invalidity Contentions" in Case 1:22-cv-01248-CJB (in the U.S. District Court for the District of Delaware).
Document STI-1248-001860, filed with Document filed Jun. 30, 2023, "Specified Technologies Inc.'s Invalidity Contentions" in Case 1:22-cv-01248-CJB (in the U.S. District Court for the District of Delaware).
Document STI-1248-001861, filed with Document filed Jun. 30, 2023, "Specified Technologies Inc.'s Invalidity Contentions" in Case 1:22-cv-01248-CJB (in the U.S. District Court for the District of Delaware).
Document STI-1248-001864, filed with Document filed Jun. 30, 2023, "Specified Technologies Inc.'s Invalidity Contentions" in Case 1:22-cv-01248-CJB (in the U.S. District Court for the District of Delaware).
Document STI-1248-001872, filed with Document filed Jun. 30, 2023, "Specified Technologies Inc.'s Invalidity Contentions" in Case 1:22-cv-01248-CJB (in the U.S. District Court for the District of Delaware).
Document STI-1248-001873, filed with Document filed Jun. 30, 2023, "Specified Technologies Inc.'s Invalidity Contentions" in Case 1:22-cv-01248-CJB (in the U.S. District Court for the District of Delaware).
Document STI-1248-001874, filed with Document filed Jun. 30, 2023, "Specified Technologies Inc.'s Invalidity Contentions" in Case 1:22-cv-01248-CJB (in the U.S. District Court for the District of Delaware).
Document STI-1248-001875, filed with Document filed Jun. 30, 2023, "Specified Technologies Inc.'s Invalidity Contentions" in Case 1:22-cv-01248-CJB (in the U.S. District Court for the District of Delaware).
Document STI-1248-001876, filed with Document filed Jun. 30, 2023, "Specified Technologies Inc.'s Invalidity Contentions" in Case 1:22-cv-01248-CJB (in the U.S. District Court for the District of Delaware).
Document STI-1248-001877, filed with Document filed Jun. 30, 2023, "Specified Technologies Inc.'s Invalidity Contentions" in Case 1:22-cv-01248-CJB (in the U.S. District Court for the District of Delaware).
Document STI-1248-001878, filed with Document filed Jun. 30, 2023, "Specified Technologies Inc.'s Invalidity Contentions" in Case 1:22-cv-01248-CJB (in the U.S. District Court for the District of Delaware).
Document STI-1248-001879, filed with Document filed Jun. 30, 2023, "Specified Technologies Inc.'s Invalidity Contentions" in Case 1:22-cv-01248-CJB (in the U.S. District Court for the District of Delaware).
Document STI-1248-001880, filed with Document filed Jun. 30, 2023, "Specified Technologies Inc.'s Invalidity Contentions" in Case 1:22-cv-01248-CJB (in the U.S. District Court for the District of Delaware).
Document STI-1248-001881, filed with Document filed Jun. 30, 2023, "Specified Technologies Inc.'s Invalidity Contentions" in Case 1:22-cv-01248-CJB (in the U.S. District Court for the District of Delaware).
Document STI-1248-001882, filed with Document filed Jun. 30, 2023, "Specified Technologies Inc.'s Invalidity Contentions" in Case 1:22-cv-01248-CJB (in the U.S. District Court for the District of Delaware).
Document STI-1248-001883, filed with Document filed Jun. 30, 2023, "Specified Technologies Inc.'s Invalidity Contentions" in Case 1:22-cv-01248-CJB (in the U.S. District Court for the District of Delaware).
Document STI-1248-001884, filed with Document filed Jun. 30, 2023, "Specified Technologies Inc.'s Invalidity Contentions" in Case 1:22-cv-01248-CJB (in the U.S. District Court for the District of Delaware).
Document STI-1248-003874, filed with Document filed Jun. 30, 2023, "Specified Technologies Inc.'s Invalidity Contentions" in Case 1:22-cv-01248-CJB (in the U.S. District Court for the District of Delaware).
Document STI-1248-003875, filed with Document filed Jun. 30, 2023, "Specified Technologies Inc.'s Invalidity Contentions" in Case 1:22-cv-01248-CJB (in the U.S. District Court for the District of Delaware).
Document STI-1248-003876, filed with Document filed Jun. 30, 2023, "Specified Technologies Inc.'s Invalidity Contentions" in Case 1:22-cv-01248-CJB (in the U.S. District Court for the District of Delaware).
Document STI-1248-003877, filed with Document filed Jun. 30, 2023, "Specified Technologies Inc.'s Invalidity Contentions" in Case 1:22-cv-01248-CJB (in the U.S. District Court for the District of Delaware).
Document STI-1248-003886, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-003887, filed with Document filed Jun. 30, 2023, "Specified Technologies Inc.'s Invalidity Contentions" in Case 1:22-cv-01248-CJB (in the U.S. District Court for the District of Delaware).
Document STI-1248-003891, filed with Document filed Jun. 30, 2023, "Specified Technologies Inc.'s Invalidity Contentions" in Case 1:22-cv-01248-CJB (in the U.S. District Court for the District of Delaware).
Document STI-1248-003904, filed with Document filed Jun. 30, 2023, "Specified Technologies Inc.'s Invalidity Contentions" in Case 1:22-cv-01248-CJB (in the U.S. District Court for the District of Delaware).
Document STI-1248-003905, filed with Document filed Jun. 30, 2023, "Specified Technologies Inc.'s Invalidity Contentions" in Case 1:22-cv-01248-CJB (in the U.S. District Court for the District of Delaware).
Document STI-1248-003906, filed with Document filed Jun. 30, 2023, "Specified Technologies Inc.'s Invalidity Contentions" in Case 1:22-cv-01248-CJB (in the U.S. District Court for the District of Delaware).
Document STI-1248-003907, filed with Document filed Jun. 30, 2023, "Specified Technologies Inc.'s Invalidity Contentions" in Case 1:22-cv-01248-CJB (in the U.S. District Court for the District of Delaware).
Document STI-1248-003908, filed with Document filed Jun. 30, 2023, "Specified Technologies Inc.'s Invalidity Contentions" in Case 1:22-cv-01248-CJB (in the U.S. District Court for the District of Delaware).
Document STI-1248-003909, filed with Document filed Jun. 30, 2023, "Specified Technologies Inc.'s Invalidity Contentions" in Case 1:22-cv-01248-CJB (in the U.S. District Court for the District of Delaware).
Document STI-1248-003910, filed with Document filed Jun. 30, 2023, "Specified Technologies Inc.'s Invalidity Contentions" in Case 1:22-cv-01248-CJB (in the U.S. District Court for the District of Delaware).
Document STI-1248-003911, filed with Document filed Jun. 30, 2023, "Specified Technologies Inc.'s Invalidity Contentions" in Case 1:22-cv-01248-CJB (in the U.S. District Court for the District of Delaware).
Document STI-1248-003912, filed with Document filed Jun. 30, 2023, "Specified Technologies Inc.'s Invalidity Contentions" in Case 1:22-cv-01248-CJB (in the U.S. District Court for the District of Delaware).
Document STI-1248-003913, filed with Document filed Jun. 30, 2023, "Specified Technologies Inc.'s Invalidity Contentions" in Case 1:22-cv-01248-CJB (in the U.S. District Court for the District of Delaware).
Document STI-1248-003914, filed with Document filed Jun. 30, 2023, "Specified Technologies Inc.'s Invalidity Contentions" in Case 1:22-cv-01248-CJB (in the U.S. District Court for the District of Delaware).
Document STI-1248-003915, filed with Document filed Jun. 30, 2023, "Specified Technologies Inc.'s Invalidity Contentions" in Case 1:22-cv-01248-CJB (in the U.S. District Court for the District of Delaware).
Document STI-1248-003916, filed with Document filed Jun. 30, 2023, "Specified Technologies Inc.'s Invalidity Contentions" in Case 1:22-cv-01248-CJB (in the U.S. District Court for the District of Delaware).
Document STI-1248-003917, filed with Document filed Jun. 30, 2023, "Specified Technologies Inc.'s Invalidity Contentions" in Case 1:22-cv-01248-CJB (in the U.S. District Court for the District of Delaware).
Document STI-1248-003918, filed with Document filed Jun. 30, 2023, "Specified Technologies Inc.'s Invalidity Contentions" in Case 1:22-cv-01248-CJB (in the U.S. District Court for the District of Delaware).
Document STI-1248-003919, filed with Document filed Jun. 30, 2023, "Specified Technologies Inc.'s Invalidity Contentions" in Case 1:22-cv-01248-CJB (in the U.S. District Court for the District of Delaware).
Document STI-1248-003920, filed with Document filed Jun. 30, 2023, "Specified Technologies Inc.'s Invalidity Contentions" in Case 1:22-cv-01248-CJB (in the U.S. District Court for the District of Delaware).
Document STI-1248-003921, filed with Document filed Jun. 30, 2023, "Specified Technologies Inc.'s Invalidity Contentions" in Case 1:22-cv-01248-CJB (in the U.S. District Court for the District of Delaware).
Document STI-1248-003922, filed with Document filed Jun. 30, 2023, "Specified Technologies Inc.'s Invalidity Contentions" in Case 1:22-cv-01248-CJB (in the U.S. District Court for the District of Delaware).
Document STI-1248-005440, filed with Document filed Jun. 30, 2023, "Specified Technologies Inc.'s Invalidity Contentions" in Case 1:22-cv-01248-CJB (in the U.S. District Court for the District of Delaware).
Document STI-1248-005441, filed with Document filed Jun. 30, 2023, "Specified Technologies Inc.'s Invalidity Contentions" in Case 1:22-cv-01248-CJB (in the U.S. District Court for the District of Delaware).
Document STI-1248-005480, filed with Document filed Jun. 30, 2023, "Specified Technologies Inc.'s Invalidity Contentions" in Case 1:22-cv-01248-CJB (in the U.S. District Court for the District of Delaware).
Document STI-1248-005481, filed with Document filed Jun. 30, 2023, "Specified Technologies Inc.'s Invalidity Contentions" in Case 1:22-cv-01248-CJB (in the U.S. District Court for the District of Delaware).
Document STI-1248-005482, filed with Document filed Jun. 30, 2023, "Specified Technologies Inc.'s Invalidity Contentions" in Case 1:22-cv-01248-CJB (in the U.S. District Court for the District of Delaware).
Document STI-1248-005483, filed with Document filed Jun. 30, 2023, "Specified Technologies Inc.'s Invalidity Contentions" in Case 1:22-cv-01248-CJB (in the U.S. District Court for the District of Delaware).
Document STI-1248-005484, filed with Document filed Jun. 30, 2023, "Specified Technologies Inc.'s Invalidity Contentions" in Case 1:22-cv-01248-CJB (in the U.S. District Court for the District of Delaware).
Document STI-1248-005486, filed with Document filed Jun. 30, 2023, "Specified Technologies Inc.'s Invalidity Contentions" in Case 1:22-cv-01248-CJB (in the U.S. District Court for the District of Delaware).
Document STI-1248-005495, filed with Document filed Jun. 30, 2023, "Specified Technologies Inc.'s Invalidity Contentions" in Case 1:22-cv-01248-CJB (in the U.S. District Court for the District of Delaware).
Document STI-1248-001779 filed with Document filed Jun. 30, 2023, "Specified Technologies Inc.'s Invalidity Contentions" in Case 1:22-cv-01248-CJB (in the U.S. District Court for the District of Delaware).
Document STI-1248-003734 filed with Document filed Jun. 30, 2023, "Specified Technologies Inc.'s Invalidity Contentions" in Case 1:22-cv-01248-CJB (in the U.S. District Court for the District of Delaware).
Document STI-1248-005362 filed with Document filed Jun. 30, 2023, "Specified Technologies Inc.'s Invalidity Contentions" in Case 1:22-cv-01248-CJB (in the U.S. District Court for the District of Delaware).
Document STI-1248-005372 filed with Document filed Jun. 30, 2023, "Specified Technologies Inc.'s Invalidity Contentions" in Case 1:22-cv-01248-CJB (in the U.S. District Court for the District of Delaware).
Document STI-1248-005420 filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-005442 filed with Document filed Jun. 30, 2023, "Specified Technologies Inc.'s Invalidity Contentions" in Case 1:22-cv-01248-CJB (in the U.S. District Court for the District of Delaware).
Document STI-1248-005443 filed with Document filed Jun. 30, 2023, "Specified Technologies Inc.'s Invalidity Contentions" in Case 1:22-cv-01248-CJB (in the U.S. District Court for the District of Delaware).
Document STI-1248-005444 filed with Document filed Jun. 30, 2023, "Specified Technologies Inc.'s Invalidity Contentions" in Case 1:22-cv-01248-CJB (in the U.S. District Court for the District of Delaware).
Document STI-1248-005453 filed with Document filed Jun. 30, 2023, "Specified Technologies Inc.'s Invalidity Contentions" in Case 1:22-cv-01248-CJB (in the U.S. District Court for the District of Delaware).
Document STI-1248-005455 filed with Document filed Jun. 30, 2023, "Specified Technologies Inc.'s Invalidity Contentions" in Case 1:22-cv-01248-CJB (in the U.S. District Court for the District of Delaware).
Document STI-1248-005464 filed with Document filed Jun. 30, 2023, "Specified Technologies Inc.'s Invalidity Contentions" in Case 1:22-cv-01248-CJB (in the U.S. District Court for the District of Delaware).
Document STI-1248-005465 filed with Document filed Jun. 30, 2023, "Specified Technologies Inc.'s Invalidity Contentions" in Case 1:22-cv-01248-CJB (in the U.S. District Court for the District of Delaware).
Document STI-1248-005466 filed with Document filed Jun. 30, 2023, "Specified Technologies Inc.'s Invalidity Contentions" in Case 1:22-cv-01248-CJB (in the U.S. District Court for the District of Delaware).
Document STI-1248-005467 filed with Document filed Jun. 30, 2023, "Specified Technologies Inc.'s Invalidity Contentions" in Case 1:22-cv-01248-CJB (in the U.S. District Court for the District of Delaware).
Document STI-1248-005468 filed with Document filed Jun. 30, 2023, "Specified Technologies Inc.'s Invalidity Contentions" in Case 1:22-cv-01248-CJB (in the U.S. District Court for the District of Delaware).
Document STI-1248-005469 filed with Document filed Jun. 30, 2023, "Specified Technologies Inc.'s Invalidity Contentions" in Case 1:22-cv-01248-CJB (in the U.S. District Court for the District of Delaware).
Document STI-1248-005470 filed with Document filed Jun. 30, 2023, "Specified Technologies Inc.'s Invalidity Contentions" in Case 1:22-cv-01248-CJB (in the U.S. District Court for the District of Delaware).
Document STI-1248-005471 filed with Document filed Jun. 30, 2023, "Specified Technologies Inc.'s Invalidity Contentions" in Case 1:22-cv-01248-CJB (in the U.S. District Court for the District of Delaware).
Document STI-1248-005472 filed with Document filed Jun. 30, 2023, "Specified Technologies Inc.'s Invalidity Contentions" in Case 1:22-cv-01248-CJB (in the U.S. District Court for the District of Delaware).
Document STI-1248-005473 filed with Document filed Jun. 30, 2023, "Specified Technologies Inc.'s Invalidity Contentions" in Case 1:22-cv-01248-CJB (in the U.S. District Court for the District of Delaware).
Document STI-1248-005474 filed with Document filed Jun. 30, 2023, "Specified Technologies Inc.'s Invalidity Contentions" in Case 1:22-cv-01248-CJB (in the U.S. District Court for the District of Delaware).
Document STI-1248-005475 filed with Document filed Jun. 30, 2023, "Specified Technologies Inc.'s Invalidity Contentions" in Case 1:22-cv-01248-CJB (in the U.S. District Court for the District of Delaware).
Document STI-1248-005476 filed with Document filed Jun. 30, 2023, "Specified Technologies Inc.'s Invalidity Contentions" in Case 1:22-cv-01248-CJB (in the U.S. District Court for the District of Delaware).
Document STI-1248-005477 filed with Document filed Jun. 30, 2023, "Specified Technologies Inc.'s Invalidity Contentions" in Case 1:22-cv-01248-CJB (in the U.S. District Court for the District of Delaware).
Document STI-1248-005478 filed with Document filed Jun. 30, 2023, "Specified Technologies Inc.'s Invalidity Contentions" in Case 1:22-cv-01248-CJB (in the U.S. District Court for the District of Delaware).
Document STI-1248-005479 filed with Document filed Jun. 30, 2023, "Specified Technologies Inc.'s Invalidity Contentions" in Case 1:22-cv-01248-CJB (in the U.S. District Court for the District of Delaware).
Document STI-1248-005497 filed with Document filed Jun. 30, 2023, "Specified Technologies Inc.'s Invalidity Contentions" in Case 1:22-cv-01248-CJB (in the U.S. District Court for the District of Delaware).
Document STI-1248-005498 filed with Document filed Jun. 30, 2023, "Specified Technologies Inc.'s Invalidity Contentions" in Case 1:22-cv-01248-CJB (in the U.S. District Court for the District of Delaware).
Document STI-1248-005535 filed with Document filed Jun. 30, 2023, "Specified Technologies Inc.'s Invalidity Contentions" in Case 1:22-cv-01248-CJB (in the U.S. District Court for the District of Delaware).
Document STI-1248-005536 filed with Document filed Jun. 30, 2023, "Specified Technologies Inc.'s Invalidity Contentions" in Case 1:22-cv-01248-CJB (in the U.S. District Court for the District of Delaware).
Document STI-1248-005538 filed with Document filed Jun. 30, 2023, "Specified Technologies Inc.'s Invalidity Contentions" in Case 1:22-cv-01248-CJB (in the U.S. District Court for the District of Delaware).
Document STI-1248-005584 filed with Document filed Jun. 30, 2023, "Specified Technologies Inc.'s Invalidity Contentions" in Case 1:22-cv-01248-CJB (in the U.S. District Court for the District of Delaware).
Document STI-1248-005758 filed with Document filed Jun. 30, 2023, "Specified Technologies Inc.'s Invalidity Contentions" in Case 1:22-cv-01248-CJB (in the U.S. District Court for the District of Delaware).
Document STI-1248-003713 filed with Document filed Jun. 30, 2023, "Specified Technologies Inc.'s Invalidity Contentions" in Case 1:22-cv-01248-CJB (in the U.S. District Court for the District of Delaware).
Document STI-1248-003714 filed with Document filed Jun. 30, 2023, "Specified Technologies Inc.'s Invalidity Contentions" in Case 1:22-cv-01248-CJB (in the U.S. District Court for the District of Delaware).
Document STI-1248-003715 filed with Document filed Jun. 30, 2023, "Specified Technologies Inc.'s Invalidity Contentions" in Case 1:22-cv-01248-CJB (in the U.S. District Court for the District of Delaware).
Document STI-1248-003717 filed with Document filed Jun. 30, 2023, "Specified Technologies Inc.'s Invalidity Contentions" in Case 1:22-cv-01248-CJB (in the U.S. District Court for the District of Delaware).
Document STI-1248-003719 filed with Document filed Jun. 30, 2023, "Specified Technologies Inc.'s Invalidity Contentions" in Case 1:22-cv-01248-CJB (in the U.S. District Court for the District of Delaware).
Document STI-1248-003720 filed with Document filed Jun. 30, 2023, "Specified Technologies Inc.'s Invalidity Contentions" in Case 1:22-cv-01248-CJB (in the U.S. District Court for the District of Delaware).
Document STI-1248-003721 filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-003726 filed with Document filed Jun. 30, 2023, "Specified Technologies Inc.'s Invalidity Contentions" in Case 1:22-cv-01248-CJB (in the U.S. District Court for the District of Delaware).
Document STI-1248-004495 filed with Document filed Jun. 30, 2023, "Specified Technologies Inc.'s Invalidity Contentions" in Case 1:22-cv-01248-CJB (in the U.S. District Court for the District of Delaware).
Document STI-1248-004496 filed with Document filed Jun. 30, 2023, "Specified Technologies Inc.'s Invalidity Contentions" in Case 1:22-cv-01248-CJB (in the U.S. District Court for the District of Delaware).
Document STI-1248-004497 filed with Document filed Jun. 30, 2023, "Specified Technologies Inc.'s Invalidity Contentions" in Case 1:22-cv-01248-CJB (in the U.S. District Court for the District of Delaware).
Document STI-1248-005407 filed with Document filed Jun. 30, 2023, "Specified Technologies Inc.'s Invalidity Contentions" in Case 1:22-cv-01248-CJB (in the U.S. District Court for the District of Delaware).
Document STI-1248-005421 filed with Document filed Jun. 30, 2023, "Specified Technologies Inc.'s Invalidity Contentions" in Case 1:22-cv-01248-CJB (in the U.S. District Court for the District of Delaware).
Document STI-1248-005505 filed with Document filed Jun. 30, 2023, "Specified Technologies Inc.'s Invalidity Contentions" in Case 1:22-cv-01248-CJB (in the U.S. District Court for the District of Delaware).
Document STI-1248-005506 filed with Document filed Jun. 30, 2023, "Specified Technologies Inc.'s Invalidity Contentions" in Case 1:22-cv-01248-CJB (in the U.S. District Court for the District of Delaware).
Document STI-1248-005511 filed with Document filed Jun. 30, 2023, "Specified Technologies Inc.'s Invalidity Contentions" in Case 1:22-cv-01248-CJB (in the U.S. District Court for the District of Delaware).
Document STI-1248-005512 filed with Document filed Jun. 30, 2023, "Specified Technologies Inc.'s Invalidity Contentions" in Case 1:22-cv-01248-CJB (in the U.S. District Court for the District of Delaware).
Document STI-1248-005515 filed with Document filed Jun. 30, 2023, "Specified Technologies Inc.'s Invalidity Contentions" in Case 1:22-cv-01248-CJB (in the U.S. District Court for the District of Delaware).
Document STI-1248-005516 filed with Document filed Jun. 30, 2023, "Specified Technologies Inc.'s Invalidity Contentions" in Case 1:22-cv-01248-CJB (in the U.S. District Court for the District of Delaware).
Document STI-1248-005517 filed with Document filed Jun. 30, 2023, "Specified Technologies Inc.'s Invalidity Contentions" in Case 1:22-cv-01248-CJB (in the U.S. District Court for the District of Delaware).
Document STI-1248-005519 filed with Document filed Jun. 30, 2023, "Specified Technologies Inc.'s Invalidity Contentions" in Case 1:22-cv-01248-CJB (in the U.S. District Court for the District of Delaware).
Document STI-1248-005534 filed with Document filed Jun. 30, 2023, "Specified Technologies Inc.'s Invalidity Contentions" in Case 1:22-cv-01248-CJB (in the U.S. District Court for the District of Delaware).
Document STI-1248-005560 filed with Document filed Jun. 30, 2023, "Specified Technologies Inc.'s Invalidity Contentions" in Case 1:22-cv-01248-CJB (in the U.S. District Court for the District of Delaware).
Document STI-1248-005576 filed with Document filed Jun. 30, 2023, "Specified Technologies Inc.'s Invalidity Contentions" in Case 1:22-cv-01248-CJB (in the U.S. District Court for the District of Delaware).
Document STI-1248-004498, filed with Document filed Jun. 30, 2023, "Specified Technologies Inc.'s Invalidity Contentions" in Case 1:22-cv-01248-CJB (in the U.S. District Court for the District of Delaware).
Document STI-1248-004499, filed with Document filed Jun. 30, 2023, "Specified Technologies Inc.'s Invalidity Contentions" in Case 1:22-cv-01248-CJB (in the U.S. District Court for the District of Delaware).
Document STI-1248-004500, filed with Document filed Jun. 30, 2023, "Specified Technologies Inc.'s Invalidity Contentions" in Case 1:22-cv-01248-CJB (in the U.S. District Court for the District of Delaware).
Document STI-1248-004501, filed with Document filed Jun. 30, 2023, "Specified Technologies Inc.'s Invalidity Contentions" in Case 1:22-cv-01248-CJB (in the U.S. District Court for the District of Delaware).
Document STI-1248-005382, filed with Document filed Jun. 30, 2023, "Specified Technologies Inc.'s Invalidity Contentions" in Case 1:22-cv-01248-CJB (in the U.S. District Court for the District of Delaware).
Document STI-1248-005393, filed with Document filed Jun. 30, 2023, "Specified Technologies Inc.'s Invalidity Contentions" in Case 1:22-cv-01248-CJB (in the U.S. District Court for the District of Delaware).
Document STI-1248-005408, filed with Document filed Jun. 30, 2023, "Specified Technologies Inc.'s Invalidity Contentions" in Case 1:22-cv-01248-CJB (in the U.S. District Court for the District of Delaware).
Document STI-1248-005409, filed with Document filed Jun. 30, 2023, "Specified Technologies Inc.'s Invalidity Contentions" in Case 1:22-cv-01248-CJB (in the U.S. District Court for the District of Delaware).
Document STI-1248-005418, filed with Document filed Jun. 30, 2023, "Specified Technologies Inc.'s Invalidity Contentions" in Case 1:22-cv-01248-CJB (in the U.S. District Court for the District of Delaware).
Document STI-1248-005445, filed with Document filed Jun. 30, 2023, "Specified Technologies Inc.'s Invalidity Contentions" in Case 1:22-cv-01248-CJB (in the U.S. District Court for the District of Delaware).
Document STI-1248-005449, filed with Document filed Jun. 30, 2023, "Specified Technologies Inc.'s Invalidity Contentions" in Case 1:22-cv-01248-CJB (in the U.S. District Court for the District of Delaware).
Document STI-1248-005451, filed with Document filed Jun. 30, 2023, "Specified Technologies Inc.'s Invalidity Contentions" in Case 1:22-cv-01248-CJB (in the U.S. District Court for the District of Delaware).
Document STI-1248-005490, filed with Document filed Jun. 30, 2023, "Specified Technologies Inc.'s Invalidity Contentions" in Case 1:22-cv-01248-CJB (in the U.S. District Court for the District of Delaware).
Document STI-1248-005496, filed with Document filed Jun. 30, 2023, "Specified Technologies Inc.'s Invalidity Contentions" in Case 1:22-cv-01248-CJB (in the U.S. District Court for the District of Delaware).
Document STI-1248-005503, filed with Document filed Jun. 30, 2023, "Specified Technologies Inc.'s Invalidity Contentions" in Case 1:22-cv-01248-CJB (in the U.S. District Court for the District of Delaware).
Document STI-1248-005504, filed with Document filed Jun. 30, 2023, "Specified Technologies Inc.'s Invalidity Contentions" in Case 1:22-cv-01248-CJB (in the U.S. District Court for the District of Delaware).
Document STI-1248-005507, filed with Document filed Jun. 30, 2023, "Specified Technologies Inc.'s Invalidity Contentions" in Case 1:22-cv-01248-CJB (in the U.S. District Court for the District of Delaware).
Document STI-1248-005508, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-005509, filed with Document filed Jun. 30, 2023, "Specified Technologies Inc.'s Invalidity Contentions" in Case 1:22-cv-01248-CJB (in the U.S. District Court for the District of Delaware).
Document STI-1248-005510, filed with Document filed Jun. 30, 2023, "Specified Technologies Inc.'s Invalidity Contentions" in Case 1:22-cv-01248-CJB (in the U.S. District Court for the District of Delaware).
Document STI-1248-005513, filed with Document filed Jun. 30, 2023, "Specified Technologies Inc.'s Invalidity Contentions" in Case 1:22-cv-01248-CJB (in the U.S. District Court for the District of Delaware).
Document STI-1248-005514, filed with Document filed Jun. 30, 2023, "Specified Technologies Inc.'s Invalidity Contentions" in Case 1:22-cv-01248-CJB (in the U.S. District Court for the District of Delaware).
Document STI-1248-005518, filed with Document filed Jun. 30, 2023, "Specified Technologies Inc.'s Invalidity Contentions" in Case 1:22-cv-01248-CJB (in the U.S. District Court for the District of Delaware).
Document STI-1248-005520, filed with Document filed Jun. 30, 2023, "Specified Technologies Inc.'s Invalidity Contentions" in Case 1:22-cv-01248-CJB (in the U.S. District Court for the District of Delaware).
Document STI-1248-005521, filed with Document filed Jun. 30, 2023, "Specified Technologies Inc.'s Invalidity Contentions" in Case 1:22-cv-01248-CJB (in the U.S. District Court for the District of Delaware).
Document STI-1248-005522, filed with Document filed Jun. 30, 2023, "Specified Technologies Inc.'s Invalidity Contentions" in Case 1:22-cv-01248-CJB (in the U.S. District Court for the District of Delaware).
Document STI-1248-005529, filed with Document filed Jun. 30, 2023, "Specified Technologies Inc.'s Invalidity Contentions" in Case 1:22-cv-01248-CJB (in the U.S. District Court for the District of Delaware).
Document STI-1248-005530, filed with Document filed Jun. 30, 2023, "Specified Technologies Inc.'s Invalidity Contentions" in Case 1:22-cv-01248-CJB (in the U.S. District Court for the District of Delaware).
Document STI-1248-005531, filed with Document filed Jun. 30, 2023, "Specified Technologies Inc.'s Invalidity Contentions" in Case 1:22-cv-01248-CJB (in the U.S. District Court for the District of Delaware).
Document STI-1248-005532, filed with Document filed Jun. 30, 2023, "Specified Technologies Inc.'s Invalidity Contentions" in Case 1:22-cv-01248-CJB (in the U.S. District Court for the District of Delaware).
Document STI-1248-005533, filed with Document filed Jun. 30, 2023, "Specified Technologies Inc.'s Invalidity Contentions" in Case 1:22-cv-01248-CJB (in the U.S. District Court for the District of Delaware).
Document STI-1248-005539, filed with Document filed Jun. 30, 2023, "Specified Technologies Inc.'s Invalidity Contentions" in Case 1:22-cv-01248-CJB (in the U.S. District Court for the District of Delaware).
Document STI-1248-005551, filed with Document filed Jun. 30, 2023, "Specified Technologies Inc.'s Invalidity Contentions" in Case 1:22-cv-01248-CJB (in the U.S. District Court for the District of Delaware).
Document STI-1248-005568, filed with Document filed Jun. 30, 2023, "Specified Technologies Inc.'s Invalidity Contentions" in Case 1:22-cv-01248-CJB (in the U.S. District Court for the District of Delaware).
Document STI-1248-005591, filed with Document filed Jun. 30, 2023, "Specified Technologies Inc.'s Invalidity Contentions" in Case 1:22-cv-01248-CJB (in the U.S. District Court for the District of Delaware).
Document STI-1248-005609, filed with Document filed Jun. 30, 2023, "Specified Technologies Inc.'s Invalidity Contentions" in Case 1:22-cv-01248-CJB (in the U.S. District Court for the District of Delaware).
Document STI-1248-005419 filed with Document filed Jun. 30, 2023, "Specified Technologies Inc.'s Invalidity Contentions" in Case 1:22-cv-01248-CJB (in the U.S. District Court for the District of Delaware).
Document STI-1248-005431 filed with Document filed Jun. 30, 2023, "Specified Technologies Inc.'s Invalidity Contentions" in Case 1:22-cv-01248-CJB (in the U.S. District Court for the District of Delaware).
Document STI-1248-005438 filed with Document filed Jun. 30, 2023, "Specified Technologies Inc.'s Invalidity Contentions" in Case 1:22-cv-01248-CJB (in the U.S. District Court for the District of Delaware).
Document STI-1248-005447 filed with Document filed Jun. 30, 2023, "Specified Technologies Inc.'s Invalidity Contentions" in Case 1:22-cv-01248-CJB (in the U.S. District Court for the District of Delaware).
Document STI-1248-005499 filed with Document filed Jun. 30, 2023, "Specified Technologies Inc.'s Invalidity Contentions" in Case 1:22-cv-01248-CJB (in the U.S. District Court for the District of Delaware).
Document STI-1248-005500 filed with Document filed Jun. 30, 2023, "Specified Technologies Inc.'s Invalidity Contentions" in Case 1:22-cv-01248-CJB (in the U.S. District Court for the District of Delaware).
Document STI-1248-005501 filed with Document filed Jun. 30, 2023, "Specified Technologies Inc.'s Invalidity Contentions" in Case 1:22-cv-01248-CJB (in the U.S. District Court for the District of Delaware).
Document STI-1248-005502 filed with Document filed Jun. 30, 2023, "Specified Technologies Inc.'s Invalidity Contentions" in Case 1:22-cv-01248-CJB (in the U.S. District Court for the District of Delaware).
Document STI-1248-005537 filed with Document filed Jun. 30, 2023, "Specified Technologies Inc.'s Invalidity Contentions" in Case 1:22-cv-01248-CJB (in the U.S. District Court for the District of Delaware).
Document STI-1248-000075, filed with Document filed Jun. 30, 2023, "Specified Technologies Inc.'s Invalidity Contentions" in Case 1:22-cv-01248-CJB (in the U.S. District Court for the District of Delaware).
Document STI-1248-000082, filed with Document filed Jun. 30, 2023, "Specified Technologies Inc.'s Invalidity Contentions" in Case 1:22-cv-01248-CJB (in the U.S. District Court for the District of Delaware).
Document STI-1248-001721, filed with Document filed Jun. 30, 2023, "Specified Technologies Inc.'s Invalidity Contentions" in Case 1:22-cv-01248-CJB (in the U.S. District Court for the District of Delaware).
Document STI-1248-003584, filed with Document filed Jun. 30, 2023, "Specified Technologies Inc.'s Invalidity Contentions" in Case 1:22-cv-01248-CJB (in the U.S. District Court for the District of Delaware).
Document STI-1248-003590, filed with Document filed Jun. 30, 2023, "Specified Technologies Inc.'s Invalidity Contentions" in Case 1:22-cv-01248-CJB (in the U.S. District Court for the District of Delaware).
Document STI-1248-003591, filed with Document filed Jun. 30, 2023, "Specified Technologies Inc.'s Invalidity Contentions" in Case 1:22-cv-01248-CJB (in the U.S. District Court for the District of Delaware).
Document STI-1248-003592, filed with Document filed Jun. 30, 2023, "Specified Technologies Inc.'s Invalidity Contentions" in Case 1:22-cv-01248-CJB (in the U.S. District Court for the District of Delaware).
Document STI-1248-003593, filed with Document filed Jun. 30, 2023, "Specified Technologies Inc.'s Invalidity Contentions" in Case 1:22-cv-01248-CJB (in the U.S. District Court for the District of Delaware).

(56) References Cited

OTHER PUBLICATIONS

Document STI-1248-003594, filed with Document filed Jun. 30, 2023, "Specified Technologies Inc.'s Invalidity Contentions" in Case 1:22-cv-01248-CJB (in the U.S. District Court for the District of Delaware).
Document STI-1248-003595, filed with Document filed Jun. 30, 2023, "Specified Technologies Inc.'s Invalidity Contentions" in Case 1:22-cv-01248-CJB (in the U.S. District Court for the District of Delaware).
Document STI-1248-003596, filed with Document filed Jun. 30, 2023, "Specified Technologies Inc.'s Invalidity Contentions" in Case 1:22-cv-01248-CJB (in the U.S. District Court for the District of Delaware).
Document STI-1248-003647, filed with Document filed Jun. 30, 2023, "Specified Technologies Inc.'s Invalidity Contentions" in Case 1:22-cv-01248-CJB (in the U.S. District Court for the District of Delaware).
Document filed Sep. 14, 2023, "Specified Technologies Inc.'s Invalidity Contentions" in Case 1:23-cv-00244-CJB (in the U.S. District Court for the District of Delaware).
Exhibit R-1 to Document filed Sep. 14, 2023, "Specified Technologies Inc.'s Invalidity Contentions" in Case 1:23-cv-00244-CJB (in the U.S. District Court for the District of Delaware).
Exhibit R-2 to Document filed Sep. 14, 2023, "Specified Technologies Inc.'s Invalidity Contentions" in Case 1:23-cv-00244-CJB (in the U.S. District Court for the District of Delaware).
Exhibit R-3 to Document filed Sep. 14, 2023, "Specified Technologies Inc.'s Invalidity Contentions" in Case 1:23-cv-00244-CJB (in the U.S. District Court for the District of Delaware).
Exhibit R-4 to Document filed Sep. 14, 2023, "Specified Technologies Inc.'s Invalidity Contentions" in Case 1:23-cv-00244-CJB (in the U.S. District Court for the District of Delaware).
Exhibit R-5 to Document filed Sep. 14, 2023, "Specified Technologies Inc.'s Invalidity Contentions" in Case 1:23-cv-00244-CJB (in the U.S. District Court for the District of Delaware).
Exhibit R-6 to Document filed Sep. 14, 2023, "Specified Technologies Inc.'s Invalidity Contentions" in Case 1:23-cv-00244-CJB (in the U.S. District Court for the District of Delaware).
Exhibit R-7 to Document filed Sep. 14, 2023, "Specified Technologies Inc.'s Invalidity Contentions" in Case 1:23-cv-00244-CJB (in the U.S. District Court for the District of Delaware).
Exhibit R-8 to Document filed Sep. 14, 2023, "Specified Technologies Inc.'s Invalidity Contentions" in Case 1:23-cv-00244-CJB (in the U.S. District Court for the District of Delaware).
Exhibit R-9 to Document filed Sep. 14, 2023, "Specified Technologies Inc.'s Invalidity Contentions" in Case 1:23-cv-00244-CJB (in the U.S. District Court for the District of Delaware).
Exhibit R-10 to Document filed Sep. 14, 2023, "Specified Technologies Inc.'s Invalidity Contentions" in Case 1:23-cv-00244-CJB (in the U.S. District Court for the District of Delaware).
Exhibit R-11 to Document filed Sep. 14, 2023, "Specified Technologies Inc.'s Invalidity Contentions" in Case 1:23-cv-00244-CJB (in the U.S. District Court for the District of Delaware).
Exhibit R-12 to Document filed Sep. 14, 2023, "Specified Technologies Inc.'s Invalidity Contentions" in Case 1:23-cv-00244-CJB (in the U.S. District Court for the District of Delaware).
Exhibit R-13 to Document filed Sep. 14, 2023, "Specified Technologies Inc.'s Invalidity Contentions" in Case 1:23-cv-00244-CJB (in the U.S. District Court for the District of Delaware).
Exhibit R-14 to Document filed Sep. 14, 2023, "Specified Technologies Inc.'s Invalidity Contentions" in Case 1:23-cv-00244-CJB (in the U.S. District Court for the District of Delaware).
Exhibit R-15 to Document filed Sep. 14, 2023, "Specified Technologies Inc.'s Invalidity Contentions" in Case 1:23-cv-00244-CJB (in the U.S. District Court for the District of Delaware).
Exhibit R-16 to Document filed Sep. 14, 2023, "Specified Technologies Inc.'s Invalidity Contentions" in Case 1:23-cv-00244-CJB (in the U.S. District Court for the District of Delaware).
Exhibit R-17 to Document filed Sep. 14, 2023, "Specified Technologies Inc.'s Invalidity Contentions" in Case 1:23-cv-00244-CJB (in the U.S. District Court for the District of Delaware).
Exhibit R-18 to Document filed Sep. 14, 2023, "Specified Technologies Inc.'s Invalidity Contentions" in Case 1:23-cv-00244-CJB (in the U.S. District Court for the District of Delaware).
Exhibit R-19 to Document filed Sep. 14, 2023, "Specified Technologies Inc.'s Invalidity Contentions" in Case 1:23-cv-00244-CJB (in the U.S. District Court for the District of Delaware).
Exhibit R-20 to Document filed Sep. 14, 2023, "Specified Technologies Inc.'s Invalidity Contentions" in Case 1:23-cv-00244-CJB (in the U.S. District Court for the District of Delaware).
Exhibit S to Document filed Sep. 14, 2023, "Specified Technologies Inc.'s Invalidity Contentions" in Case 1:23-cv-00244-CJB (in the U.S. District Court for the District of Delaware).
International Search Report issued Feb. 3, 2015 in PCT/EP2014/076168, 8 pages.
"Intumex CSP-Fire Stopping coating", Apr. 3, 2012, XP055105024, Internet URL: http://www.intumex-fs.com/pdf/datasheet/Intumex%20CSP-DS%20[EN].pdf [found on Mar. 6, 2014] the whole document, 1 pg.

DEVICE FOR PASSING PIPES OR CABLES THROUGH AN OPENING IN A BUILDING

CROSS-REFERENCE TO RELATED APPLICATIONS

This application is a Continuation of U.S. patent application Ser. No. 18/153,877, filed on Jan. 12, 2023, which is a Continuation of U.S. patent application Ser. No. 17/934,345, filed on Sep. 22, 2022, which is a Continuation of U.S. patent application Ser. No. 17/568,082, filed on Jan. 4, 2022, which is a Continuation of U.S. patent application Ser. No. 16/855,049, filed on Apr. 22, 2020, which is a Continuation of U.S. patent application Ser. No. 16/382,475, filed on Apr. 12, 2019, which is a Continuation of U.S. patent application Ser. No. 15/924,160, filed on Mar. 16, 2018, which is a Continuation of U.S. patent application Ser. No. 15/171,593 filed on Jun. 2, 2016, which is a Continuation of International Application No. PCT/EP2014/076168, filed on Dec. 2, 2014, and which claims the benefit of European Application Ser. No. 13/196,170.8, filed on Dec. 9, 2013, the contents of which are incorporated by reference herein in their entireties.

SUMMARY

The present invention relates to a device for passing pipes or cables through an opening in a building, such as, for example, a break-through in a ceiling or wall.

A cable or a pipe that is passed through walls and ceilings has to be sufficiently protected to prevent the spread of a fire. On the one hand, the objective is to prevent a fire from leaping directly through the opening to an adjacent space. On the other hand, the objective is to ensure that the spaces are thermally separated from each other, in order to prevent the temperature on the side of the relevant wall or ceiling that faces away from the fire from rising so high that that it is possible for said wall or ceiling to auto-ignite, i.e., initiate combustion by heat, but without a flame. Therefore, it is necessary to satisfy specific statutory approvals with respect to the fire protection properties.

The objective that is to be fulfilled is that the installation of cables or pipes should be simple and easy and should not be hampered by fire protection measures. To date, box-shaped housings, which form a passage channel for the lines to be installed, have been inserted into the openings for this purpose. The housing is cast into the corresponding ceiling or wall. After the pipes or cables have been passed through, the interior of the housing is filled with a fireproof sealing compound or stuffed with mineral wool and then sealed with a fireproof sealing compound that encloses the lines.

However, this solution for achieving fire protection has a number of drawbacks. The curing time of the sealing compounds is long, and the manual effort and amount of time required for installation is comparatively high. Openings that are difficult to access are hard to close. In addition, this solution does not lend itself to all applications. One example of such an application would be pre-assembled air conditioning units such as those used, for example, in larger apartment buildings. The feed lines of such a unit protrude from the base of the unit. Such a pre-assembled air conditioning unit is easy to install because the lines are inserted into a break-through in the base of the unit. Then the unit is placed on said opening so that the entire unit sits on the opening in the base and partially or completely covers said opening. It goes without saying that, for the purpose of casting the lines, which have been passed through, with a sealing compound, the housing, as described above, does not lend itself to this application because the opening in the base is no longer accessible after the unit has been set up.

Therefore, the object of the present invention is to provide a device for passing pipes or cables through an opening in a building in such a way that said device is easy to install and ensures that, on the one hand, the pipes or cables can be flexibly positioned inside the opening, but, on the other hand, said device reliably prevents a fire from spreading and sufficiently insulates the mutually adjacent spaces, which are connected by means of the opening, from each other against heat.

This engineering object is achieved by means of a device exhibiting the features disclosed in patent claim 1.

The inventive device for passing pipes or cables through an opening in a building comprises a sleeve-like housing, which has an axial passage channel that is open at its opposite ends. This housing can be cast into the relevant ceiling or wall so that the passage channel for passing said pipes or cables, which are to be installed, remains free. Mounted on the walls of the passage channel are brushes that extend into the channel and, in particular, in such a way that their bristles mesh with one another in order to close the passage channel. In addition, flexible strips of material are mounted in the passage channel, and these flexible strips of material are coated with an intumescent material, i.e., a material that expands when exposed to heat and forms a fireproof, rigid body.

The brushes are used as a convection barrier for the fumes from a fire and visually seal off the passage channel so that the opening in a building appears opaque. Upon insertion of a pipe or cable, the bristles deflect laterally and nestle around the pipes or cables so that the sealing effect is largely maintained. It is possible to select the flexibility or rather the stiffness of the bristles to match this purpose. The bristles may be made of inorganic or organic fibers that are fireproof and exhibit high stability under heat.

In the event of a fire the passage channel is closed by the intumescent material that is applied to the flexible strip. In the ideal case, the intumescent material expands and completely closes the passage channel.

With respect to the selection of the base material for the strips, there are no fundamental restrictions. It is expedient for this purpose to select a material that has a specific degree of thermostability. For example, the strips may be made from a suitable woven fabric.

The inventive arrangement of the brushes and the flexible strips offers the advantage that the free positioning of the pipes or cables inside the opening in a building is not impeded. As a result, the installation becomes much simpler, yet a fireproof closure is achieved in a reliable fashion. Furthermore, the brushes can act as a base for a sealing compound, in particular, a self-levelling sealing compound such as, for example, a self-levelling silicone sealant, which seals off the opening so that water cannot enter when waterproofing and/or gas-tightness is required.

The device of the invention offers the additional advantage that a specific degree of fire protection is ensured as early as just after the shell of the building with the finished interlocking ceilings and walls has been constructed. Then additional insulating measures, such as, for example, a mineral wool insulation, are superfluous.

According to a preferred embodiment of the present invention, the flexible strips of material protrude inwards from the walls of the passage channel in a manner similar to the brushes, and, at the same time, the strips may sag slightly downwards due to their intrinsic weight.

According to another preferred embodiment of the present invention, the base material of the flexible strips is a woven fabric, in particular, a woven glass fiber fabric. The glass fibers act as an internal reinforcement and reliably hold the foamed intumescent material of the coating in the passage channel.

According to an additional preferred embodiment, the passage channel has an approximately rectangular cross section, where in this case a brush is mounted on each of the two parallel flat walls that are opposite each other. The rows of bristles of these brushes protrude into the passage channel and face each other so that they mesh with each other at their ends and close the channel.

Preferably, the brushes are arranged on an upper end of the passage channel in the installation position, while the flexible strips are arranged so as to be staggered underneath said brushes. In this case, the brushes provide for a seal that looks opaque and for a convection barrier at the upper end of the channel, while the flexible strips of material that are located underneath can freely protrude into the channel.

According to another preferred embodiment of the invention, the housing is provided with a radially outwards extending flange on at least one of its axial ends. When the housing is installed, this flange terminates flush with the surface of the ceiling or the wall that is adjacent to the opening; or this flange rests on the surface of the ceiling or the wall that is adjacent to the opening so that the installation is easier.

A preferred exemplary embodiment of the present invention is explained in greater detail below with reference to the drawings.

DETAILED DESCRIPTION

Figure 1:
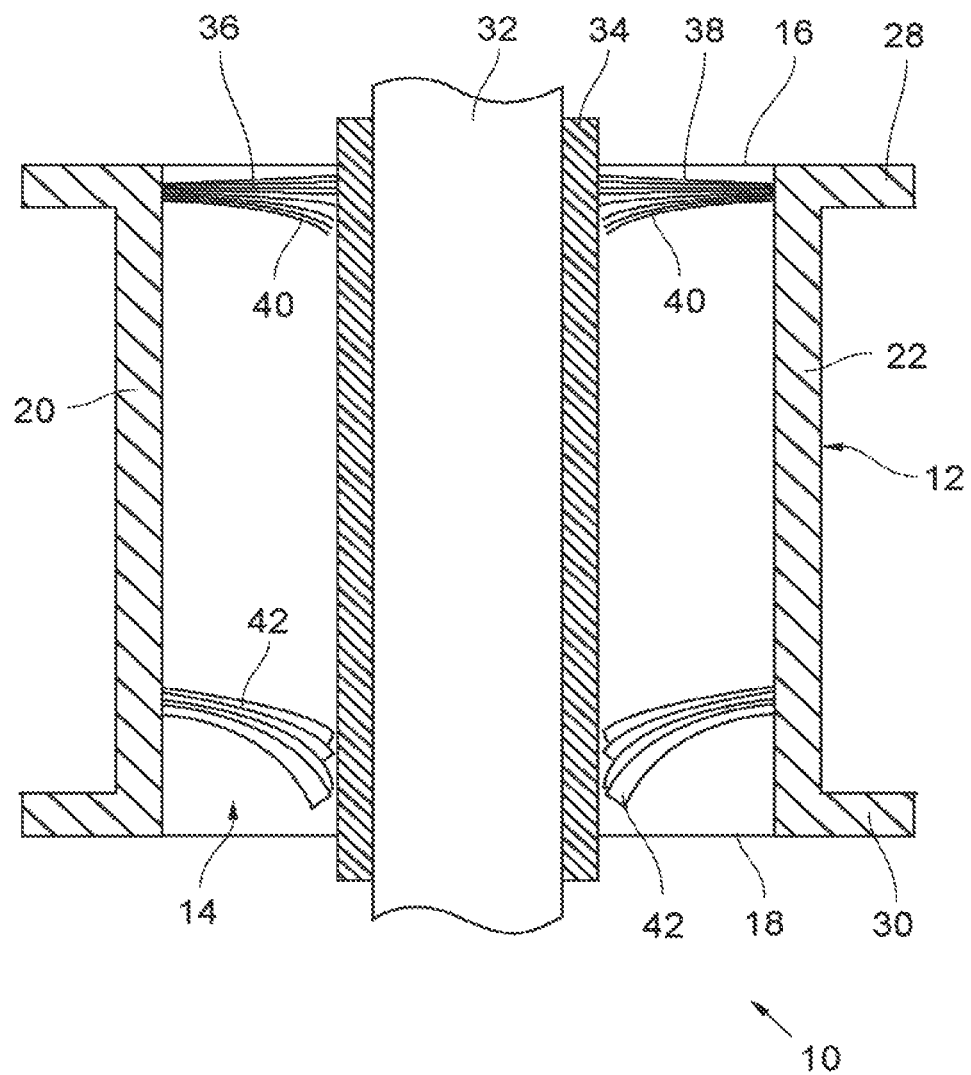
FIG. 1 is a cross sectional view of an embodiment of the inventive device for passing pipes or cables through an opening in a building.
Figure 2:
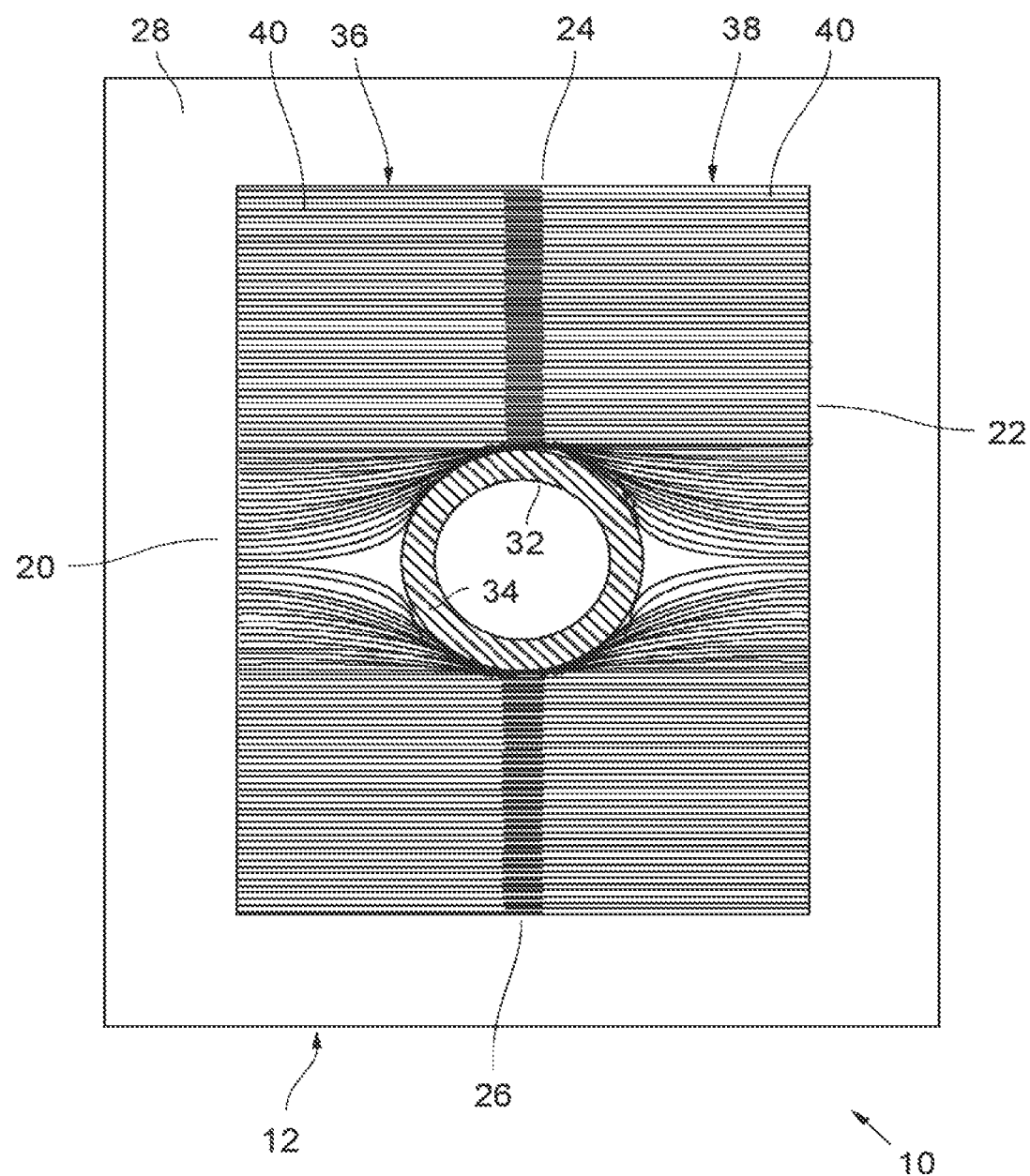
FIG. 2 is a plan view of the device shown in FIG. 1.

The device 10 that is shown in FIG. 1 and that is intended for passing pipes or cables through an opening in a building comprises a sleeve-like housing 12, which is designed more or less like a box and, as a result, has a rectangular cross section, which is much better illustrated in the plan view in FIG. 2. In the center of the housing 12 there is an axial passage channel 14, which is open at its upper end 16 and its lower end 18 and is defined by the four vertical walls 20, 22, 24, 26 of the housing. In this embodiment and throughout the entire specification as well as in the claims the terms "upper" and "lower" as well as the terms "horizontal" and "vertical" refer to the illustrated installation position of the device 12 in a ceiling of a building that is not depicted in greater detail. However, this manner of installation is not to be considered as limiting the present invention. Instead, it is also conceivable to incorporate a corresponding device in an opening in a wall, so that the housing 12 is tilted to one side in relation to the position, shown in FIG. 1; and the passage channel 14 runs horizontally.

At its upper end, the housing 12 has a radially outwards extending flange 28 that completely surrounds the upper opening 16. A corresponding radial flange 30 is also provided at the lower end of the housing 12. In the installation position shown in FIG. 1, the circumferential flanges 28, 30 are provided to terminate flush with the corresponding surfaces on the top side and the bottom side of the ceiling of a building, into which the device 10 is inserted. The device 10 is installed by casting the housing 12 with the concrete during the construction of the ceiling.

Inside the housing 12 there is a vertical pipe 32, which is surrounded with a sheath 34 made of an insulating material. This pipe 32 is shown merely for illustrative purposes as an example of a pipe or cable that is to be passed through the opening in the ceiling. As can be clearly seen in FIGS. 1 and 2, the pipe 32 has a much smaller cross section than the free opening cross section of the axial passage channel 14 so that the pipe 32 can be moved laterally during its installation therein.

At the upper end of the passage channel 14, there are two brushes 36, 38 in the upper opening 16 of the passage channel. These two brushes are mounted on the opposite longer walls 20, 22 of the passage channel 14, and the bristles 40 of the brushes extend more or less horizontally towards the center of the passage channel 14. The bristles 40 are flexible, and their length is dimensioned in such a way that they can mesh with each other in the center of the channel in order to close the passage channel 14. This situation is shown next to the pipe 32 in FIG. 2. In the middle of the passage channel 14 where the pipe 32 is inserted into the channel, the bristles 40 deflect laterally, i.e., in the plane of the flange 28, and downwards and nestle, due to their flexibility, against the outer periphery of the insulating sheath 34 of the pipe 32. As a result, the two brushes 36, 38 form a kind of curtain that closes the free cross section of the passage channel 14 in such a way that it appears opaque. In addition, said brushes form a convection barrier. The bristles 40 may be made of any suitable material, for example, an organic fibrous material or also an inorganic fibrous material. The bristles 40 are provided along the respective brush 36, 38 horizontally next to one another over the entire width of the corresponding wall 20, 22.

Prior to the insertion of the pipe 32, the two brushes 36, 38, which mesh with one another, completely close the free cross section of the passage channel 14. If the pipe 32 passes through the upper opening 16, for example, from above, then the bristles 40 endeavor to move, in the manner described above, laterally and downwards away from each other and release the cross section that is only large enough for the insertion of the pipe 32.

Furthermore, the illustrated embodiment of the device 10 according to the invention comprises flexible strips 42 of material that are mounted on the same walls 20, 22 of the housing on a level below the brushes 36, 38. Each of the strips 42 is attached with one of its ends to one of the walls 20, 22, while its free end protrudes into the passage channel 14. In this case the strip 42 can sag slightly downwards, but should have sufficient stiffness to ensure that the strips 42 of the opposite walls 20, 22 touch each other or at least come very close to each other approximately in the middle of the passage channel 14. The strips 42 rest laterally against the inserted pipe 32. In each case, a series of strips 42 extend over the entire width of the respective wall 20, 22 beneath a brush 36, 38.

The strips 42 are made of a non-flammable fabric, in particular, a woven glass fiber fabric, as a base material and are coated with an intumescent material, which expands subject to exposure to heat and forms a fireproof, rigid body. In the present case, the intumescent coating material foams on the flexible strip 42 of woven fabric in the event of a fire, so that the intumescent material completely seals the remaining free space between the outer periphery of the pipe 32 and the walls 20, 22, 24, 26 of the housing 12. In this way, a fire barrier is formed that prevents a fire from leaping over and beyond the ceiling into the respective adjoining space. Furthermore, this approach provides a thermal insulation between the spaces.

The block of foamed intumescent material, which is generated in the event of a fire, is held in the passage channel 14 by means of the glass fiber reinforcement of the flexible strips 42 of woven fabric and is prevented from falling out of the opening. Even ash can no longer fall out through the passage channel 14.

Furthermore, the brushes 36, 38 with their bristles 40 are used as a base for a self-levelling silicone sealant that is distributed among the brushes in the upper opening 16 at the upper end of the device 10. This measure allows the passage channel 14 to be sealed off against the ingress of water.

The device 10 that is depicted is easy to install and allows for a good positioning of the pipe or cable, which is to be passed through, inside the passage channel 14 because the flexible bristles 40 of the brushes 36, 38 and the flexible strips 42 of woven fabric conform readily to the outer surface of the pipe or cable and reliably close the remaining free opening cross section.

What is claimed is:

1. A device, comprising:
a housing, configured to be installed in an aperture in a ceiling or wall of a building, said housing comprising four walls forming a channel with a first and second end;
a first brush mounted on a first wall of the four walls of the housing and a second brush mounted on a second wall of the four walls of the housing, the first wall and second wall opposite each other and the first brush and the second brush extending into the channel, the first brush and the second brush comprised of bristles with said bristles configured to mesh with each other to close the passage channel, thereby forming a convection barrier;
a first flange and a second flange wherein the first flange is provided to completely surround the aperture as to the first corresponding surface of the wall or ceiling of the building and wherein the second flange is provided to completely surround the aperture as to the second corresponding surface of the wall or ceiling of the building;
a first material mounted on the first wall of the four walls of the housing, the first material comprising an intumescent and extending into the channel at a location between the first end and second end; and
a second material mounted on the second wall of the four walls of the housing, opposite the first material, the second material comprising an intumescent and extending into the channel at a location between the first end and second end,
wherein the brushes move to accommodate the passage of an object through the channel, the object to enter the channel at the first end and to exit the channel at the second end,
wherein the first material curves in an axial direction within the channel and at least partially surrounds the object in the channel as the object passes through the channel, and
wherein the first material does not directly contact the second material prior to the object passing through the channel.

2. The device of claim 1, wherein the first flange and the second flange are parallel to one another.

3. The device of claim 1, wherein the first flange and the second flange are each perpendicular to a through-direction of the channel.

4. The device of claim 1, wherein the second material curves in an axial direction within the channel and at least partially surrounds the object in the channel as the object passes through the channel.

5. The device of claim 1, wherein the first material and the second material each extend into the channel at a position offset, in a through-direction of the channel, from the first flange and the second flange.

6. The device of claim 1, wherein the first material comprises a coating, wherein the second material comprises a coating, or wherein both the first material and the second material each comprise a coating.

7. The device of claim 1, wherein the first material further comprises a fabric, wherein the second material further comprises a fabric, or wherein both the first material and the second material each further comprise a fabric.

8. The device of claim 1, wherein the first wall of the four walls of the housing is parallel to the second wall of the four walls of the housing.

9. The device of claim 8, wherein the four walls of the housing have a rectangular cross section in a plane perpendicular to a through-direction of the channel.

10. The device of claim 1, wherein the first flange has four sides, and wherein the second flange has four sides.

11. The device of claim 9, wherein the first flange has four sides, and wherein the second flange has four sides.

* * * * *